US 11,178,066 B2

(12) United States Patent
Zhong et al.

(10) Patent No.: US 11,178,066 B2
(45) Date of Patent: *Nov. 16, 2021

(54) METHOD FOR TRANSMITTING SERVICE STREAM IN FLEXIBLE ETHERNET AND APPARATUS

(71) Applicant: Huawei Technologies Co., Ltd., Shenzhen (CN)

(72) Inventors: Qiwen Zhong, Shenzhen (CN); Qiuyou Wu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,963

(22) Filed: Feb. 3, 2020

(65) Prior Publication Data

US 2020/0252346 A1 Aug. 6, 2020

Related U.S. Application Data

(63) Continuation of application No. 15/873,397, filed on Jan. 17, 2018, now Pat. No. 10,554,576, which is a (Continued)

(30) Foreign Application Priority Data

Jul. 17, 2015 (CN) .......................... 201510423022.3

(51) Int. Cl.
*H04L 12/911* (2013.01)
*H04L 12/801* (2013.01)
(Continued)

(52) U.S. Cl.
CPC ........ *H04L 47/783* (2013.01); *H04L 47/2491* (2013.01); *H04L 47/34* (2013.01);
(Continued)

(58) Field of Classification Search
CPC ....... H04J 3/16–1694; H04J 2203/0057; H04J 2203/0085; H04J 2203/0091;
(Continued)

(56) References Cited

U.S. PATENT DOCUMENTS 5,867,666 A 2/1999 Harvey
6,856,591 B1 2/2005 Ma et al.
(Continued)

FOREIGN PATENT DOCUMENTS

CA 2924089 A1 3/2015
CN 101489265 A 7/2009
(Continued)

OTHER PUBLICATIONS

He, Z. et al., "Using Flexible Ethernet to Build a Flexible Network," 16th International Conference on Advanced Communication Technology (ICACT), Feb. 16-29, 2014, pp. 872-875.

*Primary Examiner* — Pao Sinkantarakorn
(74) *Attorney, Agent, or Firm* — Slater Matsil, LLP

(57) ABSTRACT

Embodiments provide a method for transmitting a service stream in a flexible Ethernet and an apparatus. The method includes: obtaining a to-be-transmitted service stream, where the service stream is to be transmitted by using a target virtual connection supported by a physical connection group between a transmit end and a receive end, the physical connection group includes multiple physical connections and supports at least one virtual connection, and the target virtual connection is any one of the at least one virtual connection; determining, from total bandwidth resources of the multiple physical connections and according to timeslot configuration tables used by the multiple physical connections, a timeslot bandwidth resource that belongs to the target virtual connection; and transmitting the service stream
(Continued)

to the receive end by using the timeslot bandwidth resource that belongs to the target virtual connection.

20 Claims, 9 Drawing Sheets

Related U.S. Application Data continuation of application No. PCT/CN2016/090161, filed on Jul. 15, 2016.

(51) Int. Cl.
 H04L 12/857 (2013.01)
 H04L 12/811 (2013.01)
 H04L 12/869 (2013.01)
 H04L 12/851 (2013.01)

(52) U.S. Cl.
 CPC ............ *H04L 47/38* (2013.01); *H04L 47/58* (2013.01); *H04L 47/748* (2013.01); *H04L 47/24* (2013.01)

(58) Field of Classification Search
 CPC . H04L 1/0025; H04L 1/0057; H04L 43/0811; H04L 43/10; H04L 49/20
 See application file for complete search history.

(56) References Cited

U.S. PATENT DOCUMENTS

| | | |
|---|---|---|
| 7,885,546 B2 | 2/2011 | Liu et al. |
| 2010/0246396 A1 | 9/2010 | Licardie et al. |
| 2012/0294192 A1 | 11/2012 | Masood et al. |
| 2015/0055664 A1 | 2/2015 | Kanonakis et al. |
| 2016/0119075 A1 | 4/2016 | Gareau et al. |
| 2016/0294990 A1 | 10/2016 | Cao |
| 2017/0005901 A1 | 1/2017 | Gareau |

FOREIGN PATENT DOCUMENTS

| | | |
|---|---|---|
| CN | 101489565 A | 7/2009 |
| CN | 101682442 A | 3/2010 |
| CN | 102790792 A | 11/2012 |
| EP | 2963899 A1 | 1/2016 |
| WO | 2015027126 A1 | 2/2015 |
| WO | 2015089705 A1 | 6/2015 |

METHOD FOR TRANSMITTING SERVICE STREAM IN FLEXIBLE ETHERNET AND APPARATUS

CROSS-REFERENCE TO RELATED APPLICATIONS

This application is a continuation of U.S. patent application Ser. No. 15/873,397, filed on Jan. 17, 2018, which is a continuation of International Application No. PCT/CN2016/090161, filed on Jul. 15, 2016. The International Application claims priority to Chinese Patent Application No. 201510423022.3, filed on Jul. 17, 2015. All of the aforementioned patent applications are hereby incorporated by reference in their entireties.

TECHNICAL FIELD

Embodiments of the present invention relate to the Ethernet field, and more specifically, to a method for transmitting a service stream in a flexible Ethernet and an apparatus.

BACKGROUND

Introduction of a concept of a flexible Ethernet (FlexEth) provides a feasible evolution direction for virtualization of an Ethernet physical connection. In the FlexEth, one or more physical connections are bound by using cascading to constitute a physical connection group, to obtain a bandwidth resource pool. Total bandwidth resources of the bandwidth resource pool are a sum of bandwidth resources of all physical connections in the physical connection group. From another perspective, the physical connection group may be considered as a high speed logical connection that is implemented between a transmit end and a receive end. The logical connection has a total bandwidth of the bandwidths of the physical interface connections that are bound using cascading. In the FlexEth, the bandwidth resources of the physical connection group are further divided into several timeslots using time division. Several virtual connections are supported by binding the timeslots using cascading, thereby providing a powerful flexibility characteristic for data transmission in the Ethernet.

Data is transmitted over each physical connection in the physical connection group using a data frame as a period. One subframe is used as an example. The subframe includes an overhead code block at the beginning part, and then 1024 groups of information code blocks closely follow. Each group of information code blocks usually includes 20 code blocks that respectively correspond to bandwidth resources of 20 timeslots obtained using time division. When transmitting a service stream using a virtual connection supported by the physical connection group, the transmit end and the receive end need to determine, based on a timeslot configuration table used by each physical connection in the physical connection group, a timeslot bandwidth resource that belongs to the virtual connection, and then use the timeslot bandwidth resource to transmit the service stream to a receive end. In one system, a 16-bit Client field is defined in an overhead area of a physical connection, and is specially used to transmit content of the timeslot configuration table, so that the receive end can correctly restore the service stream.

However, the timeslot configuration table used by the physical connection does not always change, and information transmitted in a field specially defined for the timeslot configuration table in the overhead area may be repeated or unwanted information. In addition, the timeslot configuration table of the physical connection is excessively large, and in a current system, 40 basic frame periods are needed to transmit content of a complete timeslot configuration table to the receive end. Therefore, transmission efficiency is low.

SUMMARY

Embodiments of the present invention provide a method for transmitting a service stream in a flexible Ethernet and an apparatus, to avoid a waste of overhead resources.

According to a first aspect, a method for transmitting a service stream in a flexible Ethernet is provided. The method includes obtaining a to-be-transmitted service stream. The service stream is to be transmitted using a target virtual connection supported by a physical connection group between a transmit end and a receive end. The physical connection group includes multiple physical connections and supports at least one virtual connection, and the target virtual connection is any one of the at least one virtual connection. The method also includes determining, from total bandwidth resources of the multiple physical connections and according to timeslot configuration tables used by the multiple physical connections, a timeslot bandwidth resource that belongs to the target virtual connection. A timeslot configuration table used by each physical connection indicates a virtual connection to which each timeslot bandwidth resource obtained by dividing a bandwidth resource of each physical connection belongs. The method also includes transmitting the service stream to the receive end using the timeslot bandwidth resource that belongs to the target virtual connection. An overhead code block transmitted over each physical connection includes a first field. The first field indicates an identifier of the timeslot configuration table used by each physical connection. The overhead code block transmitted over each physical connection further includes fields used for a management channel. The management channel is used to, when the timeslot configuration table used by each physical connection changes, transmit content of a changed timeslot configuration table.

With reference to the first aspect, in an implementation of the first aspect, the management channel is further used to: when a configuration table of the physical connection group changes, transmit content of a changed configuration table of the physical connection group, where the configuration table of the physical connection group is used to indicate an identifier of each physical connection in the physical connection group and a sequence between the physical connections.

With reference to the first aspect or the foregoing implementation of the first aspect, in another implementation of the first aspect, the management channel is used to transmit, based on a protocol packet, the content of the timeslot configuration table and/or the content of the configuration table of the physical connection group.

With reference to any one of the first aspect or the foregoing implementations of the first aspect, in another implementation of the first aspect, the management channel is further used to negotiate, based on the protocol packet, a change of the timeslot configuration table and/or the configuration table of the physical connection group.

With reference to any one of the first aspect or the foregoing implementations of the first aspect, in another implementation of the first aspect, all fields of M overhead code blocks in overhead code blocks transmitted over each physical connection are used for the management channel, and M is a positive integer.

With reference to any one of the first aspect or the foregoing implementations of the first aspect, in another implementation of the first aspect, the management channel is used to transmit the content of the timeslot configuration table and/or the content of the configuration table of the physical connection group using an Ethernet packet, and synchronization headers of the M overhead code blocks are used for synchronization of the Ethernet packet.

With reference to any one of the first aspect or the foregoing implementations of the first aspect, in another implementation of the first aspect, some fields of the overhead code block transmitted over each physical connection are used for the management channel.

With reference to any one of the first aspect or the foregoing implementations of the first aspect, in another implementation of the first aspect, the management channel is a management channel of each physical connection, different physical connections in the physical connection group correspond to different management channels, and content of a timeslot configuration table used by any physical connection in the physical connection group and/or the content of the configuration table of the physical connection group are/is transmitted using a management channel corresponding to the any physical connection.

With reference to any one of the first aspect or the foregoing implementations of the first aspect, in another implementation of the first aspect, the management channel is a management channel of the physical connection group, the multiple physical connections in the physical connection group share the management channel of the physical connection group, and content of the timeslot configuration tables used by the multiple physical connections and/or the content of the configuration table of the physical connection group are/is transmitted using the management channel of the physical connection group.

According to a second aspect, a method for transmitting a service stream in a flexible Ethernet is provided. The method includes receiving a data stream using a physical connection group. The physical connection group includes multiple physical connections and supports at least one virtual connection. A target virtual connection in the at least one virtual connection is used to transmit a service stream. An overhead code block transmitted over each physical connection in the multiple physical connections includes a first field. The first field indicates an identifier of a timeslot configuration table used by each physical connection. The overhead code block transmitted over each physical connection further includes fields used for a management channel. The management channel is used to, when the timeslot configuration table used by each physical connection changes, transmit content of a changed timeslot configuration table. The method also includes determining, from total bandwidth resources of the multiple physical connections and according to timeslot configuration tables used by the multiple physical connections, a timeslot bandwidth resource that belongs to the target virtual connection, where the timeslot configuration table used by each physical connection indicates a virtual connection to which each timeslot bandwidth resource obtained by dividing a bandwidth resource of each physical connection belongs. The method also includes restoring, from the data stream and according to the timeslot bandwidth resource that belongs to the target virtual connection, the service stream transmitted over the target virtual connection.

With reference to the second aspect, in an implementation of the second aspect, the management channel is further used to, when a configuration table of the physical connection group changes, transmit content of a changed configuration table of the physical connection group. The configuration table of the physical connection group indicates an identifier of each physical connection in the physical connection group and a sequence between the physical connections.

With reference to the second aspect or the foregoing implementation of the second aspect, in another implementation of the second aspect, the management channel is used to transmit, based on a protocol packet, the content of the timeslot configuration table and/or the content of the configuration table of the physical connection group.

With reference to any one of the second aspect or the foregoing implementations of the second aspect, in another implementation of the second aspect, the management channel is further used to negotiate, based on the protocol packet, a change of the timeslot configuration table and/or the configuration table of the physical connection group.

With reference to any one of the second aspect or the foregoing implementations of the second aspect, in another implementation of the second aspect, all fields of M overhead code blocks in overhead code blocks transmitted over each physical connection are used for the management channel, and M is a positive integer.

With reference to any one of the second aspect or the foregoing implementations of the second aspect, in another implementation of the second aspect, the management channel is used to transmit the content of the timeslot configuration table and/or the content of the configuration table of the physical connection group using an Ethernet packet, and synchronization headers of the M overhead code blocks are used for synchronization of the Ethernet packet.

With reference to any one of the second aspect or the foregoing implementations of the second aspect, in another implementation of the second aspect, some fields of the overhead code block transmitted over each physical connection are used for the management channel.

With reference to any one of the second aspect or the foregoing implementations of the second aspect, in another implementation of the second aspect, the management channel is a management channel of each physical connection. Different physical connections in the physical connection group correspond to different management channels. Content of a timeslot configuration table used by any physical connection in the physical connection group and/or the content of the configuration table of the physical connection group are/is transmitted by using a management channel corresponding to the any physical connection.

With reference to any one of the second aspect or the foregoing implementations of the second aspect, in another implementation of the second aspect, the management channel is a management channel of the physical connection group. The multiple physical connections in the physical connection group share the management channel of the physical connection group, and content of the timeslot configuration tables used by the multiple physical connections and/or the content of the configuration table of the physical connection group are/is transmitted using the management channel of the physical connection group.

According to a third aspect, a transmitter is provided. The transmitter includes an obtaining module, configured to obtain a to-be-transmitted service stream. The service stream is to be transmitted using a target virtual connection supported by a physical connection group between a transmit end and a receive end. The physical connection group includes multiple physical connections and supports at least one virtual connection, and the target virtual connection is any one of the at least one virtual connection. The transmitter also includes a determining module, configured to determine, from total bandwidth resources of the multiple physical connections and according to timeslot configuration tables used by the multiple physical connections, a timeslot bandwidth resource that belongs to the target virtual connection. A timeslot configuration table used by each physical connection is used to indicate a virtual connection to which each timeslot bandwidth resource obtained by dividing a bandwidth resource of each physical connection belongs. The transmitter also includes a transmission module, configured to transmit the service stream to the receive end using the timeslot bandwidth resource that belongs to the target virtual connection. An overhead code block transmitted over each physical connection includes a first field. The first field indicates an identifier of the timeslot configuration table used by each physical connection. The overhead code block transmitted over each physical connection further includes fields used for a management channel. The management channel is used to, when the timeslot configuration table used by each physical connection changes, transmit content of a changed timeslot configuration table.

With reference to the third aspect, in an implementation of the third aspect, the management channel is further used to, when a configuration table of the physical connection group changes, transmit content of a changed configuration table of the physical connection group. The configuration table of the physical connection group is used to indicate an identifier of each physical connection in the physical connection group and a sequence between the physical connections.

With reference to the third aspect or the foregoing implementation of the third aspect, in another implementation of the third aspect, the management channel is used to transmit, based on a protocol packet, the content of the timeslot configuration table and/or the content of the configuration table of the physical connection group.

With reference to any one of the third aspect or the foregoing implementations of the third aspect, in another implementation of the third aspect, the management channel is further used to negotiate, based on the protocol packet, a change of the timeslot configuration table and/or the configuration table of the physical connection group.

With reference to any one of the third aspect or the foregoing implementations of the third aspect, in another implementation of the third aspect, all fields of M overhead code blocks in overhead code blocks transmitted over each physical connection are used for the management channel, and M is a positive integer.

With reference to any one of the third aspect or the foregoing implementations of the third aspect, in another implementation of the third aspect, the management channel is used to transmit the content of the timeslot configuration table and/or the content of the configuration table of the physical connection group by using an Ethernet packet, and synchronization headers of the M overhead code blocks are used for synchronization of the Ethernet packet.

With reference to any one of the third aspect or the foregoing implementations of the third aspect, in another implementation of the third aspect, some fields of the overhead code block transmitted over each physical connection are used for the management channel.

With reference to any one of the third aspect or the foregoing implementations of the third aspect, in another implementation of the third aspect, the management channel is a management channel of each physical connection. Different physical connections in the physical connection group correspond to different management channels. Content of a timeslot configuration table used by any physical connection in the physical connection group and/or the content of the configuration table of the physical connection group are/is transmitted by using a management channel corresponding to the any physical connection.

With reference to any one of the third aspect or the foregoing implementations of the third aspect, in another implementation of the third aspect, the management channel is a management channel of the physical connection group. The multiple physical connections in the physical connection group share the management channel of the physical connection group. Content of the timeslot configuration tables used by the multiple physical connections and/or the content of the configuration table of the physical connection group are/is transmitted using the management channel of the physical connection group.

According to a fourth aspect, a receiver is provided. The receiver includes a receiving module, configured to receive a data stream by using a physical connection group. The physical connection group includes multiple physical connections and supports at least one virtual connection. A target virtual connection in the at least one virtual connection is used to transmit a service stream. An overhead code block transmitted over each physical connection in the multiple physical connections includes a first field. The first field indicates an identifier of a timeslot configuration table used by each physical connection. The overhead code block transmitted over each physical connection further includes fields used for a management channel. The management channel is used to, when the timeslot configuration table used by each physical connection changes, transmit content of a changed timeslot configuration table. The receiver also includes a determining module, configured to determine, from total bandwidth resources of the multiple physical connections and according to timeslot configuration tables used by the multiple physical connections, a timeslot bandwidth resource that belongs to the target virtual connection. The timeslot configuration table used by each physical connection is used to indicate a virtual connection to which each timeslot bandwidth resource obtained by dividing a bandwidth resource of each physical connection belongs. The receiver also includes a restoration module, configured to restore, from the data stream and according to the timeslot bandwidth resource that belongs to the target virtual connection, the service stream transmitted over the target virtual connection.

With reference to the fourth aspect, in an implementation of the fourth aspect, the management channel is further used to: when a configuration table of the physical connection group changes, transmit content of a changed configuration table of the physical connection group, where the configuration table of the physical connection group is used to indicate an identifier of each physical connection in the physical connection group and a sequence between the physical connections.

With reference to the fourth aspect or the foregoing implementation of the fourth aspect, in another implementation of the fourth aspect, the management channel is used to transmit, based on a protocol packet, the content of the timeslot configuration table and/or the content of the configuration table of the physical connection group.

With reference to any one of the fourth aspect or the foregoing implementations of the fourth aspect, in another implementation of the fourth aspect, the management channel is further used to negotiate, based on the protocol packet, a change of the timeslot configuration table and/or the configuration table of the physical connection group.

With reference to any one of the fourth aspect or the foregoing implementations of the fourth aspect, in another implementation of the fourth aspect, all fields of M overhead code blocks in overhead code blocks transmitted over each physical connection are used for the management channel, and M is a positive integer.

With reference to any one of the fourth aspect or the foregoing implementations of the fourth aspect, in another implementation of the fourth aspect, the management channel is used to transmit the content of the timeslot configuration table and/or the content of the configuration table of the physical connection group by using an Ethernet packet, and synchronization headers of the M overhead code blocks are used for synchronization of the Ethernet packet.

With reference to any one of the fourth aspect or the foregoing implementations of the fourth aspect, in another implementation of the fourth aspect, some fields of the overhead code block transmitted over each physical connection are used for the management channel.

With reference to any one of the fourth aspect or the foregoing implementations of the fourth aspect, in another implementation of the fourth aspect, the management channel is a management channel of each physical connection, different physical connections in the physical connection group correspond to different management channels, and content of a timeslot configuration table used by any physical connection in the physical connection group and/or the content of the configuration table of the physical connection group are/is transmitted by using a management channel corresponding to the any physical connection.

With reference to any one of the fourth aspect or the foregoing implementations of the fourth aspect, in another implementation of the fourth aspect, the management channel is a management channel of the physical connection group, the multiple physical connections in the physical connection group share the management channel of the physical connection group, and content of the timeslot configuration tables used by the multiple physical connections and/or the content of the configuration table of the physical connection group are/is transmitted by using the management channel of the physical connection group.

Most fields in an overhead area are fields used for a management channel, or are occupied by a management channel. However, these fields are not fully used. In the embodiments of the present invention, a first field is defined in an overhead code block of each physical connection. The first field indicates an identifier of a timeslot configuration table used by a current physical connection, and is used to transmit, when the timeslot configuration table changes, content of a changed timeslot configuration table to a receive end using the management channel. That is, a specific field needs to be defined only for the identifier of the timeslot configuration table in the overhead area, and the content of the timeslot configuration table is transmitted over the management channel. This effectively reduces a waste of overhead resources, and provides higher flexibility.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

For ease of understanding, a current system is briefly described first.

Figure 1:
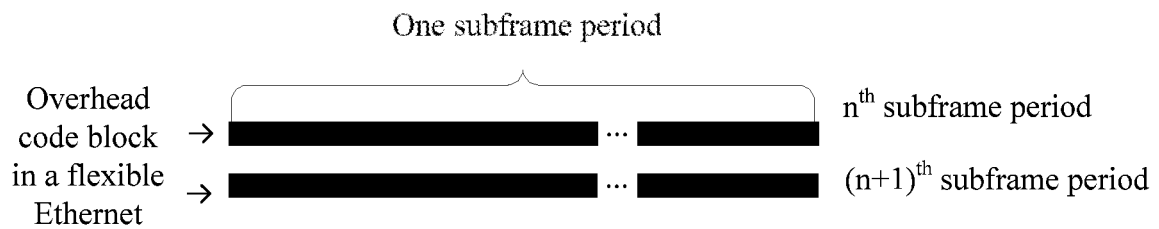
FIG. 1 is a schematic diagram of a data frame structure in a flexible Ethernet.

FIG. 1 shows a data frame structure in a flexible Ethernet. In FIG. 1, in one subframe period, an overhead code block in the FlexEth is followed by several information code blocks with a 64×66b structure, such as 20,480 information code blocks with the 64×66b structure. Several consecutive subframe periods (usually four subframes) constitute one basic frame. Several consecutive basic frames (usually 40 basic frames) constitute one super frame.

Figure 2:
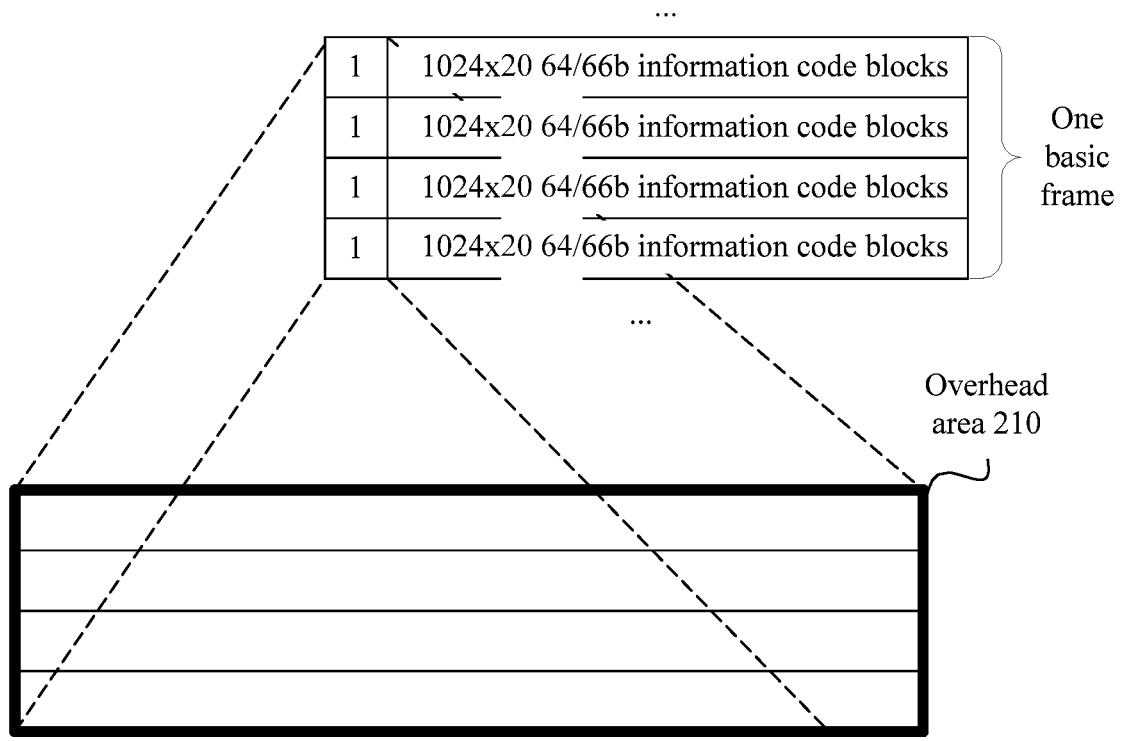
FIG. 2 is a schematic diagram of an overhead area formed by overhead code blocks in a basic frame period in the prior art.

FIG. 2 is an overhead area formed by overhead code blocks in one basic frame period. One basic frame usually includes four subframes, a header of each subframe includes one overhead code block, and there are four overhead code blocks in total. In the FlexEth, one overhead code block usually includes 66 bits, and 4×66 bits of the four overhead code blocks jointly constitute an overhead area 210 shown in FIG. 2. In the current system, the overhead area is used to transmit content of a timeslot configuration table of a physical connection. Table 1A shows the overhead area 210 in the current system.

TABLE 1A

The overhead area 210 in the prior art (bits 0 to 31)

| SH | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|----|---|---|---|---|---|---|---|---|---|---|----|----|----|----|----|----|----|----|----|----|----|----|----|----|
| 1 | 0 | | | 0x4B | | | | | UC | PC | PF | | | | | | | PHY Map | | | | | | |
| 0 | 1 | UC | | FlexE Group Number | | | | | | | | | | | | | Client | | | | | | | |
| 0 | 1 | UC | | Reserved | | | | | | | | | | | | | | | | | | | | |
| 0 | 1 | | | | | | | | | | | | | | | | | | | | | | | |

| | | | | | | | | | | | | SH | 24 | 25 | 26 | 27 | 28 | 29 | 30 | 31 |
|---|---|---|---|---|---|---|---|---|---|---|---|----|----|----|----|----|----|----|----|----|
| | | | | | | | | | | | | 1 | 0 | | | | This PHY | | | |
| | | | | | | | | | | | | 0 | 1 | | | | | | | |
| | | | | | | | | | | | | 0 | 1 | | | | | | | |
| | | | | | | | | | | | | 0 | 1 | | | | | | | |

The overhead area 210 in the prior art (bits 32 to 63)

| 32 | 33 | 3 | 3 | 3 | 3 | 3 | 3 | 4 | 4 | 4 | 4 | 4 | 4 | 4 | 4 |
|----|----|---|---|---|---|---|---|---|---|---|---|---|---|---|---|
| | Ox5 | | | | | | | | | 0x000_0000 | | | | | |

The overhead area 210 in the prior art (bits 32 to 63)

| 4 | 4 | 5 | 5 | 5 | 5 | 5 | 5 | 5 | 5 | 5 | 59 | 60 | 61 | 62 | 63 |
|---|---|---|---|---|---|---|---|---|---|---|----|----|----|----|----|
| | | | | | | | CRC-16 | | | | | | | | |

Table 1A shows an overhead area of a physical connection. In the current system, an overhead area of each physical connection in a physical connection group is the same as that shown in Table 1. In Table 1A, a PHY Map field is used to transmit content of a configuration table of a physical connection group. This PHY is an identifier of a current physical connection. FlexE Group Number is an identifier of a physical connection group to which the current physical connection belongs. A Client field is used to transmit content of a timeslot configuration table used by the current physical connection. Certainly, some fields used for other purposes are further included in Table 1, such as a synchronization header field SH. All remaining empty fields other than particular fields identified in Table 1A are used for a management channel, or are occupied by a management channel. It can be learned from Table 1A, a large part (18 octets) of the overhead area 210 is used for the management channel.

In the current system, a bandwidth resource of each physical connection is usually divided into bandwidth resources of 20 timeslots. A transmit end and a receive end are usually configured with two timeslot configuration tables: Calender A and Calender B. In the current system, content of these two tables needs to be transmitted over the Client field, and a transmission manner is shown in Table 1B.

TABLE 1B

A process of carrying timeslot configuration tables
Calender A and Calender B in the Client field

| | |
|---|---|
| 0 | Calendar A Client Slot 0 |
| 0 | Calendar A Client Slot 1 |
| ... | ... |
| 0 | Calendar A Client Slot 19 |
| 1 | Calendar B Client Slot 0 |
| 1 | Calendar B Client Slot 1 |
| ... | ... |
| 1 | Calendar B Client Slot 19 |

In Table 1B, 0 and 1 in the first row are values of a PC field in the overhead area 210. The PC field may indicate a table that is currently used by the current physical connection: Calendar A or Calendar B. As shown in Table 2, fields PC corresponding to Calendar A are all 0, and fields PC corresponding to Calendar B are all 1. It indicates that the current physical connection currently uses Calendar B, instead of Calender A. In addition, each basic frame period can only indicate a virtual connection to which one timeslot resource belongs, and each timeslot configuration table indicates virtual connections to which resources of 20 timeslots corresponding to physical connections belong. Therefore, at least 40 basic frame periods are needed to transmit complete Calendar A and Calendar B, and efficiency is extremely low. In addition, one of Calendar A or Calendar B is not used, and it is equivalent to that overhead resources are wasted for transmitting unwanted information.

To avoid a waste of overhead resources, an embodiment of the present invention provides a method for transmitting a service stream in a flexible Ethernet. Details are described in the following with reference to FIG. 3.

Figure 3:
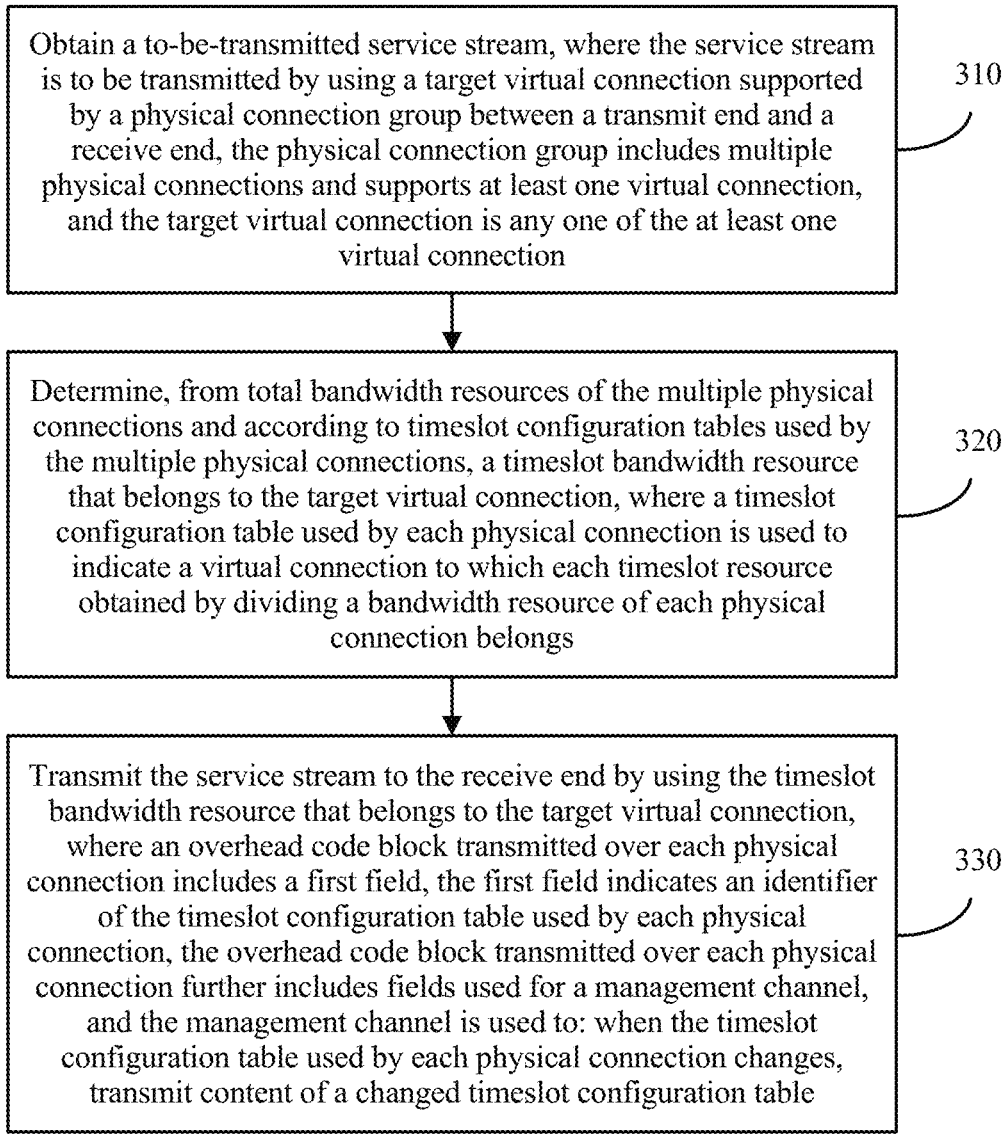
FIG. 3 is a schematic flowchart of a method for transmitting a service stream in a flexible Ethernet according to an embodiment of the present invention.

FIG. 3 is a schematic flowchart of a method for transmitting a service stream in a flexible Ethernet according to an embodiment of the present invention. The method in FIG. 3 may be executed by a transmit end. The method includes the following steps.

310. Obtain a to-be-transmitted service stream, where the service stream is to be transmitted by using a target virtual connection supported by a physical connection group between a transmit end and a receive end. The physical connection group includes multiple physical connections and supports at least one virtual connection. The target virtual connection is any one of the at least one virtual connection.

It should be understood that the foregoing physical connection group may be considered as a logical connection between the transmit end and the receive end, and a bandwidth of the logical connection may be a sum of bandwidths of all physical connections in the physical connection group.

It should be further understood that, in a flexible Ethernet, total bandwidth resources of the physical connection group are divided into bandwidth resources of several timeslots obtained using time division in the physical connection group, so as to support a virtual connection. Specifically, a bandwidth resource of a physical connection in the physical connection group may be divided into multiple timeslot bandwidth resources. Different timeslot bandwidth resources may belong to the same or different virtual connections, and timeslot bandwidth resources that belong to the same virtual connection are used to transmit a same service stream. The physical connection group may support one or more virtual connections, and different service streams (or service streams of different clients) may be transmitted over different virtual connections.

320. Determine, from total bandwidth resources of the multiple physical connections and according to timeslot configuration tables used by the multiple physical connections, a timeslot bandwidth resource that belongs to the target virtual connection, where a timeslot configuration table used by each physical connection indicates a virtual connection to which each timeslot resource obtained by dividing a bandwidth resource of each physical connection belongs.

It should be understood that the timeslot configuration table used by each physical connection may be used to record a correspondence between each timeslot bandwidth resource of the physical connection and a virtual connection supported by the physical connection group. One timeslot bandwidth resource corresponds to one virtual connection, and different timeslot bandwidth resources may correspond to the same or to different virtual connections.

330. Transmit the service stream to the receive end using the timeslot bandwidth resource that belongs to the target virtual connection. An overhead code block transmitted over each physical connection includes a first field. The first field indicates an identifier of the timeslot configuration table used by each physical connection. The overhead code block transmitted over each physical connection further includes fields used for a management channel. The management channel is used to, when the timeslot configuration table used by each physical connection changes, transmit content of a changed timeslot configuration table.

It should be understood that the overhead code block that is transmitted over each physical connection further including fields used for a management channel may be as follows. The overhead code block transmitted over each physical connection further includes a field occupied by the management channel. The management channel may occupy fields of overhead code blocks in multiple manners. For example, the management channel may occupy some fields of an overhead code block; or may occupy all fields (including synchronization headers) of some overhead code blocks. That is, the management channel occupies a whole overhead code block. Certainly, alternatively, a combination of the two manners may be used. This is not specifically limited in this embodiment of the present invention. An example is used for description. In four consecutive overhead code blocks, the management channel does not occupy a field of a first overhead code block, but occupies some fields of the last three overhead code blocks. Alternatively, in 20 consecutive overhead code blocks, the management channel does not occupy any field of the first three overhead code blocks, but occupies all fields of the last 17 overhead code blocks. That is, the management channel occupies the last 17 overhead code blocks.

It should be noted that, a change of the timeslot configuration table used by each physical connection may specifically indicate an update to content of the timeslot configuration table of each physical connection, or may indicate that each physical connection uses a new timeslot configuration table to replace an old timeslot configuration table.

The foregoing first field may be a field that is specially defined to indicate an identifier of the timeslot configuration table used by each physical connection. For example, the identifier of the timeslot configuration table may be indicated by using Slot Configuration Table ID. A transmit end and a receive end may uniquely identify a timeslot configuration table by using the identifier of the timeslot configuration table.

Specifically, enough identifiers of the timeslot configuration table may be pre-configured, so as to distinguish between timeslot configuration tables of all physical connections in the physical connection group. That a length of an identifier of a physical connection in the physical connection group is 8 bits is used as an example. One physical connection group may include a maximum of 256 physical connections. It is assumed that n labels, such as oxoo, 0xFF, and the like, are used as reserved labels and used for other purposes. In this case, the physical connection group may include a maximum of 256-n physical connections. Timeslot configuration tables used by the physical connections in the physical connection group may be the same, or may be different. For same timeslot configuration tables, a same timeslot configuration table identifier may be used. In general, in an extreme case, 256-n identifiers for timeslot configuration tables that are being used may be needed to identify the 256-n timeslot configuration tables that are being used. That is, one timeslot configuration table is used by each physical connection. In this case, no timeslot configuration table identifier is available for a new timeslot configuration table. Therefore, some reserved identifiers are further needed. For example, an identifier=0x00 or 0xFF or both of the timeslot configuration table are used as reserved identifiers. If no other timeslot configuration table is available, and a timeslot configuration table needs to be updated, an identifier of the timeslot configuration table of the physical connection may be temporarily switched to a reserved identifier before a process for negotiating the update of the timeslot configuration table begins, and is switched back to an identifier, other than the reserved identifier, of a normal timeslot configuration table after the update is complete. Alternatively, identifiers=0-255 of the timeslot configuration tables are treated equally. Therefore, in any case, the 256-n physical connections cannot use all of the 256 identifiers of the timeslot configuration tables. That is, at least one of the identifiers of the timeslot configuration tables is available. After a new table is used by a physical connection, an original table may be abolished, and an identifier of the timeslot configuration table of the physical connection may be retrieved for use. Further, there is a simpler manner. That is, a manner of extending a field length of Slot Configuration Table ID to, for example, 9 bits may be used. 9 bits can be used to distinguish between 512 tables. Certainly, alternatively, the identifier of the timeslot configuration table used by the physical connection may not be changed, and only content of the timeslot configuration table used by the physical connection group is updated. This is not specifically limited in this embodiment of the present invention.

Most fields in an overhead area are fields used for a management channel, or are occupied by a management channel. However, these fields are not fully used. In this embodiment of the present invention, a first field is defined in an overhead code block of each physical connection. The first field indicates an identifier of a timeslot configuration table used by a current physical connection, and is used to transmit, when the timeslot configuration table changes, content of a changed timeslot configuration table to a receive end using the management channel. That is, a specific field needs to be defined only for the identifier of the timeslot configuration table in the overhead area, and the content of the timeslot configuration table is transmitted over the management channel. This effectively reduces a waste of overhead resources, and provides higher flexibility.

Optionally, in an embodiment, M overhead code blocks transmitted over each physical connection may be all used for the management channel. Table 2 is used as an example for description in the following. Table 2 shows a definition manner of an overhead area according to an embodiment of the present invention.

TABLE 2

| An overhead area (bits 0 to 31) | | | | | | | | | | | | | | | | | |
|---|---|---|---|---|---|---|---|---|---|---|---|---|---|---|---|---|---|
| SH | | 0 | 1 | 2 | 3 | 4 | 5 | 6 | 7 | 8 | 9 | 10 | 11 | 12 | 13 | 14 | 15 |
| 1 | 0 | | | | 0x78 | | | | | | | | | 0xAA | | | |
| 0 | 1 | | | | | | | | | | | | | | | | |
| 0 | 1 | | | | | | | | | | | | | | | | |
| | | | | | | | | Management Channel | | | | | | | | | |
| SH | | 16 | 17 | 18 | 19 | 20 | 21 | 22 | 23 | 24 | 25 | 27 | 28 | 29 | 30 | 31 | |
| 1 | 0 | | | | Group ID Label | | | | | | | This Phy ID Label | | | | | |
| 0 | 1 | | | | | | | | | | | | | | | | |
| 0 | 1 | | | | | | | | | | | | | | | | |
| | | | | | | | | Management Channel | | | | | | | | | |

| An overhead area (bits 32 to 63) | | | | | | | | | | | | | | | | | |
|---|---|---|---|---|---|---|---|---|---|---|---|---|---|---|---|---|---|
| 32 | 33 | 34 | 35 | 36 | 37 | 38 | 39 | 40 | 41 | 42 | 43 | 44 | 45 | 46 | 47 | 48 | |
| | | Next Phy ID Label | | | | | | | Slot Configuration Table ID | | | | | | | | |
| | | | | | | | | | Slot Configuration Table ID | | | | | | | | |
| | | | | | | | | | Slot Configuration Table ID | | | | | | | | |
| | | | | | | | Management Channel | | | | | | | | | | |

| An overhead area (bits 32 to 63) | | | | | | | | | | | | | | | |
|---|---|---|---|---|---|---|---|---|---|---|---|---|---|---|---|
| 49 | 50 | 51 | 52 | 53 | 54 | 55 | 56 | 57 | 58 | 59 | 60 | 61 | 62 | 63 | |
| | | | | | | | | | | | | | | 0xAA | |
| | | | | | | CRC-16 | | | | | | | | | |
| | | | | | | Management Channel | | | | | | | | | |

In Table 2, This Phy ID Label is an identifier of a current physical connection. Next Phy ID Label is an identifier of a next physical connection of the current physical connection in the physical connection group. Slot Configuration Table ID is a timeslot configuration table identifier. In an embodiment corresponding to Table 2, to avoid an error, the identifier of the timeslot configuration table is transmitted three times. When identifiers of the timeslot configuration table that are transmitted three times and received by the receive end are inconsistent, an identifier with a largest quantity among the received identifiers is preferred. Certainly, alternatively, the identifier of the timeslot configuration table may be transmitted only once, or the identifier of the timeslot configuration table is transmitted more times. This is not specifically limited in this embodiment of the present invention. In addition, in the embodiment corresponding to Table 2, a specific field for a CRC check is defined in the overhead area, so as to further ensure accurate transmission of the identifier of the timeslot configuration table. Certainly, alternatively, the field may not be defined in actual situation. In Table 2, the management channel occupies at least one overhead code block (including a synchronization header) after the first three overhead code blocks. That is, all fields of the at least one overhead code block are used for the management channel. Certainly, alternatively, the management channel may occupy only some fields of some overhead code blocks, or occupy some fields of some overhead code blocks and occupy all fields of other overhead code blocks. This is not specifically limited in this embodiment of the present invention.

Optionally, in an embodiment, some fields of the overhead code block transmitted over each physical connection are used for the management channel. Table 3A and Table 3B are used as examples for description in the following. An overhead area in Table 3A is an overhead area formed by four overhead code blocks in one basic frame.

TABLE 3A

| An overhead area (bits 0 to 31) | | | | | | | | | | | | | | | | | |
|---|---|---|---|---|---|---|---|---|---|---|---|---|---|---|---|---|---|
| SH | | 0 | 1 | 2 | 3 | 4 | 5 | 6 | 7 | 8 | 9 | 10 | 11 | 12 | 13 | 14 | 15 |
| 1 | 0 | | | | | 0x4B | | | | | | | Last Phy ID Label | | | | |
| 0 | 1 | RF | R | R | R | R | R | R | R | | | | Group ID Label | | | | |
| 0 | 1 | Reserved | | | | | | | | | | | | | | | |
| 0 | 1 | | | | | | | | | | | | | | | | |
| SH | | 16 | 17 | 18 | 19 | 20 | 21 | 22 | 23 | 24 | 25 | 26 | 27 | 28 | 29 | 30 | 31 |
| 1 | 0 | | | | This Phy ID Label | | | | | | | Next Phy ID Label | | | | | |
| 0 | 1 | | | | Slot Configuration Table ID | | | | | | | | | | | | |
| 0 | 1 | | | | | | | | | | | | | | | | |
| 0 | 1 | | | | | | | | | | | | | | | | |

TABLE 3A-continued

| An overhead area (bits 0 to 31) | | | | | | | | | | | | | | | |
|---|---|---|---|---|---|---|---|---|---|---|---|---|---|---|---|
| An overhead area (bits 32 to 63) | | | | | | | | | | | | | | | |
| 32 | 33 | 34 | 35 | 36 | 37 | 38 | 39 | 40 | 41 | 42 | 43 | 44 | 45 | 46 | 47 |
| 0x5 | | | | | | | | | | | | | | | |
| An overhead area (bits 32 to 63) | | | | | | | | | | | | | | | |
| 48 | 49 | 50 | 51 | 52 | 53 | 54 | 55 | 56 | 57 | 58 | 59 | 60 | 61 | 62 | 63 |
| CRC-16 | | | | | | | | | | | | | | | |

In an embodiment corresponding to Table 3A, bits 16 to 23 of a second overhead code block in one basic frame period are defined as a first field, and are used to transmit the identifier of the timeslot configuration table (e.g., Slot Configuration Table ID in Table 3A). Other unidentified areas belong to the management channel, and some areas in the management channel may be used to transmit the content of the timeslot configuration table.

TABLE 3B

| An overhead area (bits 0 to 31) | | | | | | | | | | | | | | | |
|---|---|---|---|---|---|---|---|---|---|---|---|---|---|---|---|
| SH | 0 | 1 | 2 | 3 | 4 | 5 | 6 | 7 | 8 | 9 | 10 | 11 | 12 | 13 | 14 |
| 1 | 0 | | | 0x4B | | | | | C1 | C2 | C3 | C4 | C5 | C6 | C7 |
| 0 | 1 | E | | Calendar slot #(ID) | | | | AB | | | | | | | |
| 0 | 1 | E | | Calendar slot #(ID) | | | | AB | | | | | | | |
| SH | 15 | 16 | 17 | 18 | 19 | 21 | 22 | 23 | 24 | 25 | 26 | 27 | 28 | 29 | 30 | 31 |
| 1 | 0 | C8 | C9 | | | | | | | | | | | | | |
| 0 | 1 | | | | | | | | | | | | | | | |
| 0 | 1 | | | | | | | | | | | | | | | |
| An overhead area (bits 32 to 63) | | | | | | | | | | | | | | | | |
| 32 | 33 | 34 | 35 | 36 | 37 | 38 | 39 | 40 | 41 | 42 | 43 | 44 | 45 | 46 | 47 | |
| 0x5 | | | | | | | | | | | | | | | | |
| Client ID | | | | | | | | | | | | | | | | |
| Client ID | | | | | | | | | | | | | | | | |
| An overhead area (bits 32 to 63) | | | | | | | | | | | | | | | | |
| 48 | 49 | 50 | 51 | 52 | 53 | 54 | 55 | 56 | 57 | 58 | 59 | 60 | 61 | 62 | 63 | |
| CRC-16 | | | | | | | | | | | | | | | | |

In Table 3B, all or some of the unidentified areas may be used for the management channel. For example, fields used for the management channel include: an E field, a Calendar slot #(ID) field, an AB field, and a Client field of the second overhead code block; and an E field, a Calendar slot #(ID) field, an AB field, and a Client field of a third overhead code block. The foregoing four fields of the second overhead code block constitute one management channel, and the foregoing four fields of the third overhead code block constitute another management channel. Either of the management channels can bear a small message (e.g., a micro packet), and the message may be an empty message or a non-empty message. The management channel may be used to transmit the content of the timeslot configuration table, or the like. A message format of the management channel is as follows:

| E | Calendar slot #(ID) | AB | Client |
|---|---|---|---|
| ... | | | |

| | | | |
|---|---|---|---|
| 0 | Null | | |
| 1 | 1 | A | Client ID = 0x3335 |
| 1 | 9 | A | Client ID = 0x3336 |
| 0 | Null | | |
| ... | | | |

E is used to identify whether the message is an empty message or a non-empty message. E=0 indicates that the message is an empty message, and E=1 indicates that the message is a non-empty message. Further, the non-empty message is used to transmit an identifier of a virtual connection to which a timeslot bandwidth resource belongs in the timeslot configuration table A or the timeslot configuration table B, that is, Client ID in the above table.

The AB field indicates that an identifier of a virtual connection in the message is an identifier in Calendar A or an identifier in Calendar B. The Calendar slot #(ID) field indicates a timeslot bandwidth resource to which the identifier of the virtual connection in the message corresponds in the current physical connection. The Client ID field indicates an identifier of a virtual connection to which the timeslot bandwidth resource belongs. When the timeslot configuration table of the physical connection changes, the foregoing some fields used for the management channel may be used to indicate a changed timeslot configuration table; or when the timeslot configuration table is not updated, the fields may be set as empty or other special fields, and are not used to transmit information of the timeslot configuration table. The foregoing some fields used for the management channel are used to identify a start location and an end location of the packet based on a determined location of a determined code block that includes the some fields. It is equivalent to that transmission of the content of the timeslot configuration table over the management channel is achieved by using a micro packet. C1-C9 in the overhead area correspond to timeslot configuration tables used by nine timeslot bandwidth resources. C1 is used to indicate that a timeslot configuration table used by a timeslot bandwidth resource 1 is Calendar A or Calendar B. That is, the timeslot bandwidth resource belongs to a virtual link in a timeslot configuration table.

Optionally, in an embodiment, the management channel is used to transmit, based on a protocol packet, the content of the timeslot configuration table and/or the content of the configuration table of the physical connection group.

The protocol packet includes an Ethernet packet, a High-Level Data Link Control (HDLC) packet, or a point to point (PPP) packet.

Optionally, in an embodiment, the management channel is further used to negotiate a change of the timeslot configuration table based on the protocol packet.

It should be understood that the management channel being further used to negotiate a change of the timeslot configuration table based on the protocol packet may include the following. When the timeslot configuration table changes, the transmit end sends a request packet over the management channel, where the request packet carries the content of the changed timeslot configuration table. The transmit end receives a response packet from the receive end, where the response packet is used to instruct the receive end to determine the change of the timeslot configuration table. Alternatively, the transmit end receives a response packet from the receive end, where the response packet is used to instruct the receive end to deny the change of the timeslot configuration table. In this case, the transmit end may send a request packet again before an acknowledgment is received from the receive end.

Table 4 shows a format of a protocol packet transmitted over a management channel. Client ID Label for Slot o is used to indicate an identifier of a virtual connection to which a timeslot o of a current physical connection belongs. Likewise, Client ID Label for Slot m is used to indicate an identifier of a virtual connection to which a timeslot m of the current physical connection belongs. In addition, a field that is used to indicate a start location and an end location of the packet, a CRC check field, or the like may be further added into the packet. This is not specifically limited in this embodiment of the present invention.

TABLE 4

A format of a protocol packet according
to an embodiment of the present invention Group ID Label
This PHY ID Label
Client ID Label for Slot 0
Client ID Label for Slot 1
. . .
Client ID Label for Slot m − 1
Client ID Label for Slot m Table 5 shows another format of a protocol packet transmitted over a management channel. A field CRC is used for CRC check, so as to avoid a bit error operation. In addition, idle octets are added at two ends of the packet, so as to identify a start location and an end location of the packet. An example of an idle octet is 0x55. When coding is performed, an indication bit=1 may be added to indicate that the indication bit is an idle octet between packets. For example, when another effective packet octet is coded, an indication bit=1 is added to identify a start, continuance, and an end of the packet. Message Type=0x01 may be used to indicate that a type of the packet is a packet that is used to indicate a change of the timeslot configuration table. Message Length=m+4 may be used to indicate a length of the packet.

TABLE 5

A format of a protocol packet according
to an embodiment of the present invention . . .
Idle Octets
Message Type = 0x01
Message Length = m + 4
Phy ID Label 1
Phy ID Label 2
. . .
Phy ID Label m − 1
Phy ID Label m
CRC
Idle Octets
. . .

After receiving the packet, the receive end may reply with an acknowledgment packet or a non-acknowledgment packet. The acknowledgment packet and the non-acknowledgment packet may be identified by using a field Message Type. A value of Message Type for the acknowledgment packet may be 0x02, and a value of the Message Type for the non-acknowledgment packet may be 0x03. It should be noted that, the field Message Length of the foregoing packet is optional, and may not be carried.

It should be understood that, the receive end and the transmit end may negotiate a change of a timeslot configuration table, and agree that a service stream in a current period is received or transmitted still based on the unchanged timeslot configuration table. Content of a newly configured timeslot configuration table is sent to the receive end in the current frame period. After the receive end receives the changed timeslot configuration table, in a next or n frame periods (a specific time may be negotiated by the transmit end and the receive end) following the current frame period, the transmit end and the receive end receive and transmit a service stream according to a changed timeslot configuration table that is determined by means of negotiation. For a specific process, refer to Table 6.

TABLE 6

A relationship table between an update of a timeslot configuration
table and receiving and transmission of a service stream

|  | Basic frame period 1 | Basic frame period 2 | Basic frame period 3 | Basic frame period 4 | Basic frame period 5 |
| --- | --- | --- | --- | --- | --- |
| Timeslot configuration table | Next configuration for a timeslot configuration table is configuration 1 | Next configuration for a timeslot configuration table is configuration 2 | Next configuration for a timeslot configuration table is configuration 3 | Next configuration for a timeslot configuration table is configuration 4 | . . . |
| Receiving and transmission of a service stream | . . . | A service is received or transmitted based on the configuration 1 of the timeslot configuration table | A service is received or transmitted based on the configuration 2 of the timeslot configuration table | A service is received or transmitted based on the configuration 3 of the timeslot configuration table | A service is received or transmitted based on the configuration 4 of the timeslot configuration table |

It may be learned from Table 6 that, even if a timeslot configuration table changes in one basic frame period, before a next basic frame period arrives, the service stream in a current basic frame period is received or transmitted still based on the unchanged timeslot configuration table.

Optionally, in an embodiment, all fields of M overhead code blocks in overhead code blocks transmitted over each physical connection are used for the management channel, and M is a positive integer.

That is, the M code blocks are used for the management channel, or the management channel occupies the M code blocks, including synchronization headers of the M code blocks.

Optionally, in an embodiment, the management channel is used to transmit the content of the timeslot configuration table by using an Ethernet packet, and synchronization headers of the M overhead code blocks are used for synchronization of the Ethernet packet.

Certainly, alternatively, the management channel may use a packet of another protocol, such as an HDLC packet or a PPP packet. Synchronization of such a packet may be performed by using a specific synchronization manner of the another protocol.

Optionally, in an embodiment, the management channel is a management channel of each physical connection, different physical connections in the physical connection group correspond to different management channels, and content of a timeslot configuration table used by any physical connection in the physical connection group is transmitted by using a management channel corresponding to the any physical connection.

Specifically, alternatively, the management channel of each physical connection may be referred to as a separated management channel of each physical connection. That is, one management channel is used to transmit related information of only one physical connection.

Optionally, in an embodiment, the management channel is a management channel of the physical connection group, the multiple physical connections in the physical connection group share the management channel of the physical connection group, and content of the timeslot configuration tables used by the multiple physical connections is transmitted by using the management channel of the physical connection group.

Specifically, alternatively, the management channel of the physical connection group may be referred to as a management channel aggregated (or cascaded) with multiple physical connections. That is, one management channel is used to transmit related information of all physical connections in a whole physical connection group.

It should be noted that, the identifier and the transmission manner of the timeslot configuration table are used as examples for description in the following. A configuration table of the physical connection group may also be transmitted in a similar manner. For example, content of the configuration table of the physical connection group is transmitted over the management channel, and an identifier of the configuration table of the physical connection group is transmitted by using a field specially defined in the overhead area. The management channel used to transmit the configuration table of the physical connection group may be a management channel corresponding to each physical connection, or may be a management channel corresponding to the physical connection group. In addition, the management channel may be used to transmit the content of the configuration table of the physical connection group based on a protocol packet, and be used to negotiate and update the configuration table based on the protocol packet. Details are not described in this embodiment of the present invention again.

The foregoing has described in detail, with reference to FIG. 3, the method for transmitting a service stream in a flexible Ethernet according to an embodiment of the present invention from the perspective of the transmit end. The following describes in detail, with reference to FIG. 4, a method for transmitting a service stream in a flexible Ethernet according to an embodiment of the present invention from the perspective of the receive end.

It should be understood that, interaction, a related characteristic, and a related function of the transmit end and the receive end described from the perspective of the transmit end are corresponding to those described from the perspective of the receive end. For brevity, repeated descriptions are appropriately omitted.

Figure 4:
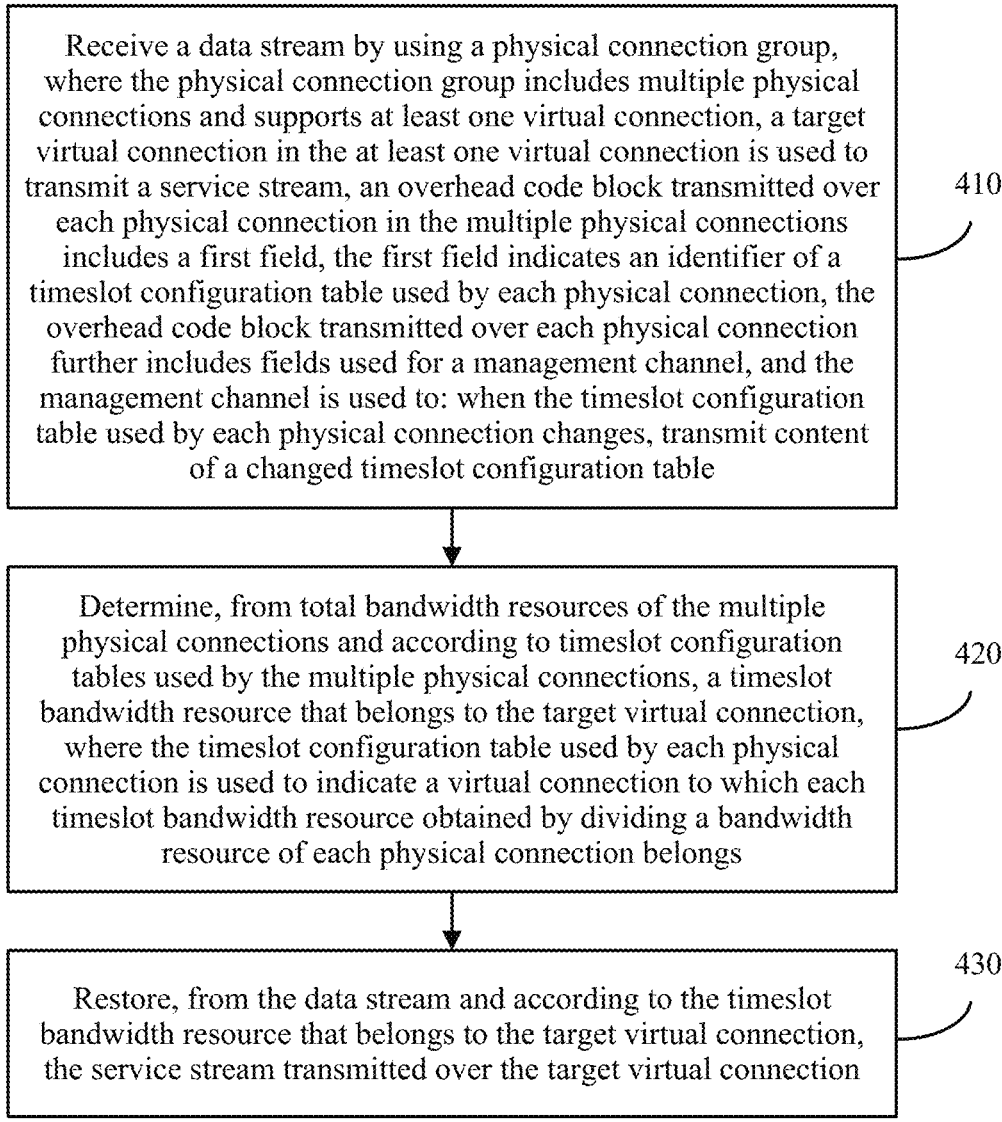
FIG. 4 is a schematic flowchart of a method for transmitting a service stream in a flexible Ethernet according to an embodiment of the present invention.

FIG. 4 is a schematic flowchart of a method for transmitting a service stream in a flexible Ethernet according to an embodiment of the present invention. The method in FIG. 4 may be executed by a receive end. The method includes the following steps.

410. Receive a data stream using a physical connection group, where the physical connection group includes multiple physical connections and supports at least one virtual connection. A target virtual connection in the at least one virtual connection is used to transmit a service stream. An overhead code block transmitted over each physical connection in the multiple physical connections includes a first field, and the first field indicates an identifier of a timeslot configuration table used by each physical connection. The overhead code block transmitted over each physical connection further includes fields used for a management channel, and the management channel is used to, when the timeslot configuration table used by each physical connection changes, transmit content of a changed timeslot configuration table.

420. Determine, from total bandwidth resources of the multiple physical connections and according to timeslot configuration tables used by the multiple physical connections, a timeslot bandwidth resource that belongs to the target virtual connection, where the timeslot configuration table used by each physical connection is used to indicate a virtual connection to which each timeslot bandwidth resource obtained by dividing a bandwidth resource of each physical connection belongs.

430. Restore, from the data stream and according to the timeslot bandwidth resource that belongs to the target virtual connection, the service stream transmitted over the target virtual connection.

Most fields in an overhead area are fields used for a management channel, or are occupied by a management channel. However, these fields are not fully used. In this embodiment of the present invention, a first field is defined in an overhead code block of each physical connection. The first field indicates an identifier of a timeslot configuration table used by a current physical connection, and is used to transmit, when the timeslot configuration table changes, content of a changed timeslot configuration table to a receive end using the management channel. That is, a specific field needs to be defined only for the identifier of the timeslot configuration table in the overhead area, and the content of the timeslot configuration table is transmitted over the management channel. This effectively reduces a waste of overhead resources, and provides higher flexibility.

Optionally, in an embodiment, the management channel is further used to: when a configuration table of the physical connection group changes, transmit content of a changed configuration table of the physical connection group, where the configuration table of the physical connection group is used to indicate an identifier of each physical connection in the physical connection group and a sequence between the physical connections.

Optionally, in an embodiment, the management channel is used to transmit, based on a protocol packet, the content of the timeslot configuration table and/or the content of the configuration table of the physical connection group.

Optionally, in an embodiment, the management channel is further used to negotiate, based on the protocol packet, a change of the timeslot configuration table and/or the configuration table of the physical connection group.

Optionally, in an embodiment, all fields of M overhead code blocks in overhead code blocks transmitted over each physical connection are used for the management channel, and M is a positive integer.

Optionally, in an embodiment, the management channel is used to transmit the content of the timeslot configuration table and/or the content of the configuration table of the physical connection group by using an Ethernet packet, and synchronization headers of the M overhead code blocks are used for synchronization of the Ethernet packet.

Optionally, in an embodiment, the management channel is a management channel of each physical connection. Different physical connections in the physical connection group correspond to different management channels. Content of a timeslot configuration table used by any physical connection in the physical connection group, and/or the content of the configuration table of the physical connection group, are/is transmitted using a management channel corresponding to the any physical connection.

Optionally, in an embodiment, the management channel is a management channel of the physical connection group, the multiple physical connections in the physical connection group share the management channel of the physical connection group, and content of the timeslot configuration tables used by the multiple physical connections and/or the content of the configuration table of the physical connection group are/is transmitted using the management channel of the physical connection group.

The foregoing has described in detail, with reference to FIG. 1 to FIG. 4, the method for transmitting a service stream in a flexible Ethernet according to an embodiment of the present invention. The following describes in detail, with reference to FIG. 5 to FIG. 8A, a transmitter and a receiver according to embodiments of the present invention.

Figure 5:
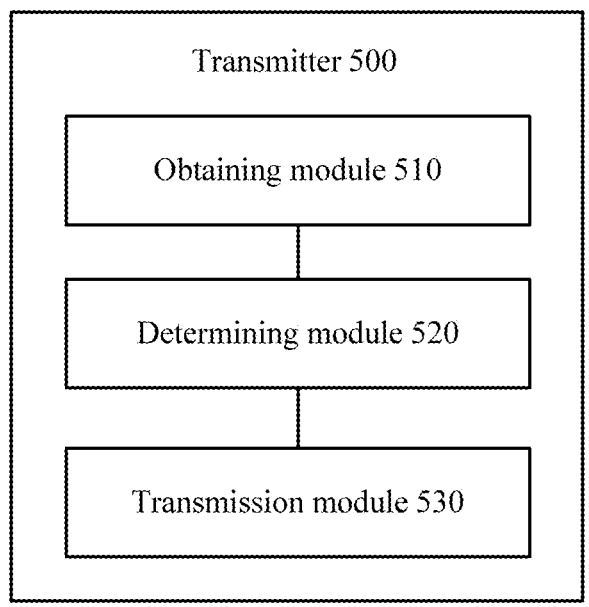
FIG. 5 is a schematic structural diagram of a transmitter according to an embodiment of the present invention.

FIG. 5 is a schematic structural diagram of a transmitter according to an embodiment of the present invention. It should be understood that, the transmitter 500 in FIG. 5 can implement steps executed by the transmit end in FIG. 3. To avoid repetition, details are not described herein again. The transmitter 500 includes an obtaining module 510, configured to obtain a to-be-transmitted service stream, where the service stream is to be transmitted by using a target virtual connection supported by a physical connection group between a transmit end and a receive end, the physical connection group includes multiple physical connections and supports at least one virtual connection, and the target virtual connection is any one of the at least one virtual connection. The transmitter 500 also includes a determining module 520, configured to determine, from total bandwidth resources of the multiple physical connections and according to timeslot configuration tables used by the multiple physical connections, a timeslot bandwidth resource that belongs to the target virtual connection, where a timeslot configuration table used by each physical connection is used to indicate a virtual connection to which each timeslot bandwidth resource obtained by dividing a bandwidth resource of each physical connection belongs. The transmitter 500 also includes a transmission module 530, configured to transmit the service stream to the receive end by using the timeslot bandwidth resource that belongs to the target virtual connection, where an overhead code block transmitted over each physical connection includes a first field, the first field indicates an identifier of the timeslot configuration table used by each physical connection, the overhead code block transmitted over each physical connection further includes fields used for a management channel, and the management channel is used to: when the timeslot configuration table used by each physical connection changes, transmit content of a changed timeslot configuration table.

Most fields in an overhead area are fields used for a management channel, or are occupied by a management channel. However, these fields are not fully used. In this embodiment of the present invention, a first field is defined in an overhead code block of each physical connection. The first field indicates an identifier of a timeslot configuration table used by a current physical connection, and is used to transmit, when the timeslot configuration table changes, content of a changed timeslot configuration table to a receive end using the management channel. That is, a specific field needs to be defined only for the identifier of the timeslot configuration table in the overhead area, and the content of the timeslot configuration table is transmitted over the management channel. This effectively reduces a waste of overhead resources, and provides higher flexibility.

Optionally, in an embodiment, the management channel is further used to, when a configuration table of the physical connection group changes, transmit content of a changed configuration table of the physical connection group. The configuration table of the physical connection group indicates an identifier of each physical connection in the physical connection group and a sequence between the physical connections.

Optionally, in an embodiment, the management channel is used to transmit, based on a protocol packet, the content of the timeslot configuration table and/or the content of the configuration table of the physical connection group.

Optionally, in an embodiment, the management channel is further used to negotiate, based on the protocol packet, a change of the timeslot configuration table and/or the configuration table of the physical connection group.

Optionally, in an embodiment, all fields of M overhead code blocks in overhead code blocks transmitted over each physical connection are used for the management channel, and M is a positive integer.

Optionally, in an embodiment, the management channel is used to transmit the content of the timeslot configuration table and/or the content of the configuration table of the physical connection group using an Ethernet packet, and synchronization headers of the M overhead code blocks are used for synchronization of the Ethernet packet.

Optionally, in an embodiment, some fields of the overhead code block transmitted over each physical connection are used for the management channel.

Optionally, in an embodiment, the management channel is a management channel of each physical connection, different physical connections in the physical connection group correspond to different management channels, and content of a timeslot configuration table used by any physical connection in the physical connection group and/or the content of the configuration table of the physical connection group are/is transmitted by using a management channel corresponding to the any physical connection.

Optionally, in an embodiment, the management channel is a management channel of the physical connection group. The multiple physical connections in the physical connection group share the management channel of the physical connection group. Content of the timeslot configuration tables used by the multiple physical connections and/or the content of the configuration table of the physical connection group are/is transmitted by using the management channel of the physical connection group.

Figure 6:
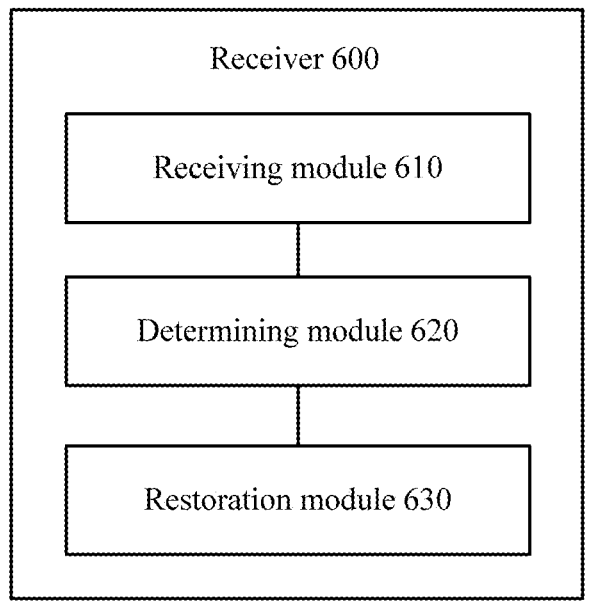
FIG. 6 is a schematic structural diagram of a receiver according to an embodiment of the present invention.

FIG. 6 is a schematic structural diagram of a receiver according to an embodiment of the present invention. It should be understood that, the receiver 600 in FIG. 6 can implement steps executed by the receive end in FIG. 4. To avoid repetition, details are not described herein again. The receiver 600 includes a receiving module 610, configured to receive a data stream by using a physical connection group, where the physical connection group includes multiple physical connections and supports at least one virtual connection, a target virtual connection in the at least one virtual connection is used to transmit a service stream, an overhead code block transmitted over each physical connection in the multiple physical connections includes a first field, the first field indicates an identifier of a timeslot configuration table used by each physical connection, the overhead code block transmitted over each physical connection further includes fields used for a management channel, and the management channel is used to: when the timeslot configuration table used by each physical connection changes, transmit content of a changed timeslot configuration table. The receiver 600 also includes a determining module 620, configured to determine, from total bandwidth resources of the multiple physical connections and according to timeslot configuration tables used by the multiple physical connections, a timeslot bandwidth resource that belongs to the target virtual connection, where the timeslot configuration table used by each physical connection is used to indicate a virtual connection to which each timeslot bandwidth resource obtained by dividing a bandwidth resource of each physical connection belongs. The receiver 600 also includes a restoration module 630, configured to restore, from the data stream and according to the timeslot bandwidth resource that belongs to the target virtual connection, the service stream transmitted over the target virtual connection.

A large part of an overhead area is used for a management channel, or is occupied by a management channel. However, this part of the overhead area is not fully used. In this embodiment of the present invention, a first field is defined in an overhead code block of each physical connection. The first field indicates an identifier of a timeslot configuration table used by a current physical connection, and is used to transmit, when the timeslot configuration table changes, content of a changed timeslot configuration table to a receive end by using the management channel. That is, a specific field needs to be defined only for the identifier of the timeslot configuration table in the overhead area, and the content of the timeslot configuration table is transmitted over the management channel. This effectively reduces a waste of overhead resources, and provides higher flexibility.

Optionally, in an embodiment, the management channel is further used to, when a configuration table of the physical connection group changes, transmit content of a changed configuration table of the physical connection group, where the configuration table of the physical connection group is used to indicate an identifier of each physical connection in the physical connection group and a sequence between the physical connections.

Optionally, in an embodiment, the management channel is used to transmit, based on a protocol packet, the content of the timeslot configuration table and/or the content of the configuration table of the physical connection group.

Optionally, in an embodiment, the management channel is further used to negotiate, based on the protocol packet, a change of the timeslot configuration table and/or the configuration table of the physical connection group.

Optionally, in an embodiment, all fields of M overhead code blocks in overhead code blocks transmitted over each physical connection are used for the management channel, and M is a positive integer.

Optionally, in an embodiment, the management channel is used to transmit the content of the timeslot configuration table and/or the content of the configuration table of the physical connection group using an Ethernet packet, and synchronization headers of the M overhead code blocks are used for synchronization of the Ethernet packet.

Optionally, in an embodiment, some fields of the overhead code block transmitted over each physical connection are used for the management channel.

Optionally, in an embodiment, the management channel is a management channel of each physical connection, different physical connections in the physical connection group correspond to different management channels, and content of a timeslot configuration table used by any physical connection in the physical connection group and/or the content of the configuration table of the physical connection group are/is transmitted by using a management channel corresponding to the any physical connection.

Optionally, in an embodiment, the management channel is a management channel of the physical connection group, the multiple physical connections in the physical connection group share the management channel of the physical connection group, and content of the timeslot configuration tables used by the multiple physical connections and/or the content of the configuration table of the physical connection group are/is transmitted by using the management channel of the physical connection group.

Figure 7:
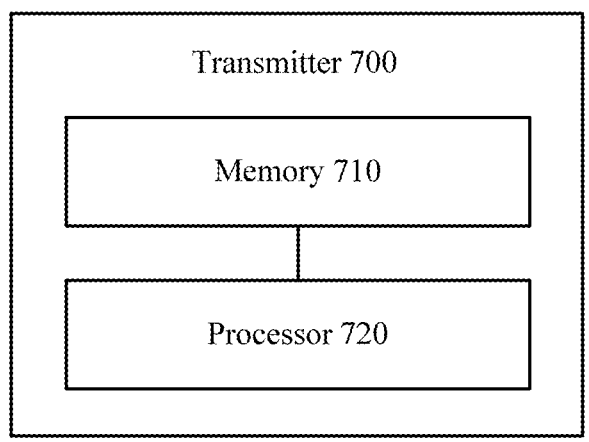
FIG. 7 is a schematic structural diagram of a transmitter according to an embodiment of the present invention.

FIG. 7 is a schematic structural diagram of a transmitter according to an embodiment of the present invention. It should be understood that, the transmitter 700 in FIG. 7 can implement steps executed by the transmit end in FIG. 3. To avoid repetition, details are not described herein again. The transmitter 700 in FIG. 7 includes a memory 710, configured to store a program. Transmitter 700 also includes a processor 720, configured to execute the program. When the program is executed, the processor 720 is configured to: obtain a to-be-transmitted service stream, where the service stream is to be transmitted by using a target virtual connection supported by a physical connection group between a transmit end and a receive end, the physical connection group includes multiple physical connections and supports at least one virtual connection, and the target virtual connection is any one of the at least one virtual connection; determine, from total bandwidth resources of the multiple physical connections and according to timeslot configuration tables used by the multiple physical connections, a timeslot bandwidth resource that belongs to the target virtual connection, where a timeslot configuration table used by each physical connection is used to indicate a virtual connection to which each timeslot bandwidth resource obtained by dividing a bandwidth resource of each physical connection belongs; and transmit the service stream to the receive end by using the timeslot bandwidth resource that belongs to the target virtual connection, where an overhead code block transmitted over each physical connection includes a first field, the first field indicates an identifier of the timeslot configuration table used by each physical connection, the overhead code block transmitted over each physical connection further includes fields used for a management channel, and the management channel is used to: when the timeslot configuration table used by each physical connection changes, transmit content of a changed timeslot configuration table.

Most fields in an overhead area are fields used for a management channel, or are occupied by a management channel. However, these fields are not fully used. In this embodiment of the present invention, a first field is defined in an overhead code block of each physical connection. The first field indicates an identifier of a timeslot configuration table used by a current physical connection, and is used to transmit, when the timeslot configuration table changes, content of a changed timeslot configuration table to a receive end using the management channel. That is, a specific field needs to be defined only for the identifier of the timeslot configuration table in the overhead area, and the content of the timeslot configuration table is transmitted over the management channel. This effectively reduces a waste of overhead resources, and provides higher flexibility.

Optionally, in an embodiment, the management channel is further used to, when a configuration table of the physical connection group changes, transmit content of a changed configuration table of the physical connection group, where the configuration table of the physical connection group is used to indicate an identifier of each physical connection in the physical connection group and a sequence between the physical connections.

Optionally, in an embodiment, the management channel is used to transmit, based on a protocol packet, the content of the timeslot configuration table and/or the content of the configuration table of the physical connection group.

Optionally, in an embodiment, the management channel is further used to negotiate, based on the protocol packet, a change of the timeslot configuration table and/or the configuration table of the physical connection group.

Optionally, in an embodiment, all fields of M overhead code blocks in overhead code blocks transmitted over each physical connection are used for the management channel, and M is a positive integer.

Optionally, in an embodiment, the management channel is used to transmit the content of the timeslot configuration table and/or the content of the configuration table of the physical connection group by using an Ethernet packet, and synchronization headers of the M overhead code blocks are used for synchronization of the Ethernet packet.

Optionally, in an embodiment, some fields of the overhead code block transmitted over each physical connection are used for the management channel.

Optionally, in an embodiment, the management channel is a management channel of each physical connection, different physical connections in the physical connection group correspond to different management channels, and content of a timeslot configuration table used by any physical connection in the physical connection group and/or the content of the configuration table of the physical connection group are/is transmitted by using a management channel corresponding to the any physical connection.

Optionally, in an embodiment, the management channel is a management channel of the physical connection group, the multiple physical connections in the physical connection group share the management channel of the physical connection group, and content of the timeslot configuration tables used by the multiple physical connections and/or the content of the configuration table of the physical connection group are/is transmitted by using the management channel of the physical connection group.

Figure 8:
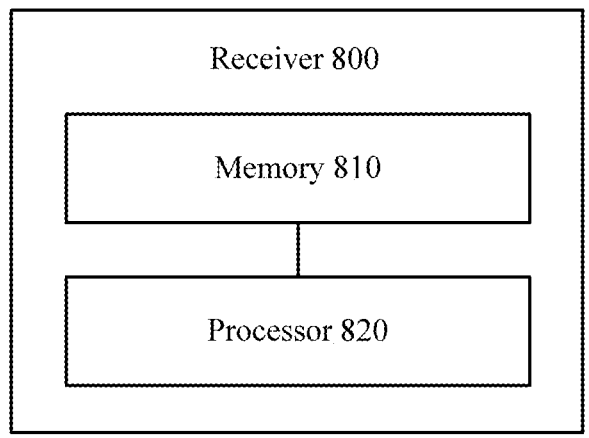
FIG. 8 is a schematic structural diagram of a receiver according to an embodiment of the present invention.

FIG. 8 is a schematic structural diagram of a receiver according to an embodiment of the present invention. The receiver 800 in FIG. 8 includes a memory 810, configured to store a program. The receiver 800 also includes a processor 820, configured to execute the program. When the program is executed, the processor 820 is specifically configured to, receive a data stream by using a physical connection group, where the physical connection group includes multiple physical connections and supports at least one virtual connection, a target virtual connection in the at least one virtual connection is used to transmit a service stream, an overhead code block transmitted over each physical connection in the multiple physical connections includes a first field, the first field indicates an identifier of a timeslot configuration table used by each physical connection, the overhead code block transmitted over each physical connection further includes fields used for a management channel, and the management channel is used to: when the timeslot configuration table used by each physical connection changes, transmit content of a changed timeslot configuration table; determine, from total bandwidth resources of the multiple physical connections and according to timeslot configuration tables used by the multiple physical connections, a timeslot bandwidth resource that belongs to the target virtual connection, where the timeslot configuration table used by each physical connection is used to indicate a virtual connection to which each timeslot bandwidth resource obtained by dividing a bandwidth resource of each physical connection belongs; and restore, from the data stream and according to the timeslot bandwidth resource that belongs to the target virtual connection, the service stream transmitted over the target virtual connection.

Most fields in an overhead area are fields used for a management channel, or are occupied by a management channel. However, these fields are not fully used. In this embodiment of the present invention, a first field is defined in an overhead code block of each physical connection. The first field indicates an identifier of a timeslot configuration table used by a current physical connection, and is used to transmit, when the timeslot configuration table changes, content of a changed timeslot configuration table to a receive end by using the management channel. That is, a specific field needs to be defined only for the identifier of the timeslot configuration table in the overhead area, and the content of the timeslot configuration table is transmitted over the management channel. This effectively reduces a waste of overhead resources, and provides higher flexibility.

Optionally, in an embodiment, the management channel is further used to: when a configuration table of the physical connection group changes, transmit content of a changed configuration table of the physical connection group, where the configuration table of the physical connection group is used to indicate an identifier of each physical connection in the physical connection group and a sequence between the physical connections.

Optionally, in an embodiment, the management channel is used to transmit, based on a protocol packet, the content of the timeslot configuration table and/or the content of the configuration table of the physical connection group.

Optionally, in an embodiment, the management channel is further used to negotiate, based on the protocol packet, a change of the timeslot configuration table and/or the configuration table of the physical connection group.

Optionally, in an embodiment, all fields of M overhead code blocks in overhead code blocks transmitted over each physical connection are used for the management channel, and M is a positive integer.

Optionally, in an embodiment, the management channel is used to transmit the content of the timeslot configuration table and/or the content of the configuration table of the physical connection group by using an Ethernet packet, and synchronization headers of the M overhead code blocks are used for synchronization of the Ethernet packet.

Optionally, in an embodiment, some fields of the overhead code block transmitted over each physical connection are used for the management channel.

Optionally, in an embodiment, the management channel is a management channel of each physical connection, different physical connections in the physical connection group correspond to different management channels, and content of a timeslot configuration table used by any physical connection in the physical connection group and/or the content of the configuration table of the physical connection group are/is transmitted by using a management channel corresponding to the any physical connection.

Optionally, in an embodiment, the management channel is a management channel of the physical connection group, the multiple physical connections in the physical connection group share the management channel of the physical connection group, and content of the timeslot configuration tables used by the multiple physical connections and/or the content of the configuration table of the physical connection group are/is transmitted by using the management channel of the physical connection group.

Figure 9:
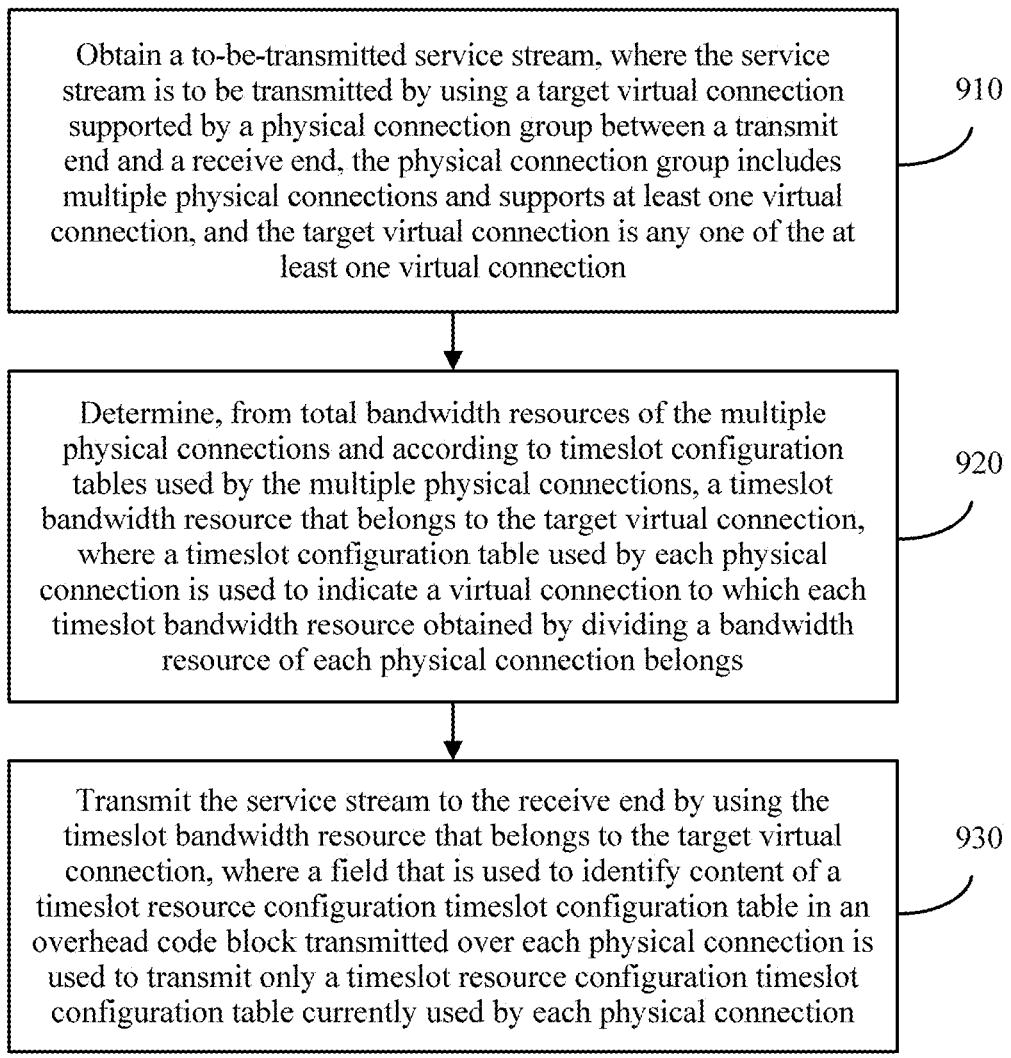
FIG. 9 is a schematic flowchart of a method for transmitting a data stream in a flexible Ethernet according to an embodiment of the present invention.

The following provides another embodiment of the present invention with reference to FIG. 9.

FIG. 9 is a schematic flowchart of a method for transmitting a data stream in a flexible Ethernet according to an embodiment of the present invention. The method in FIG. 9 may be executed by a transmit end. The method includes the following steps.

910. Obtain a to-be-transmitted service stream, where the service stream is to be transmitted by using a target virtual connection supported by a physical connection group between a transmit end and a receive end, the physical connection group includes multiple physical connections and supports at least one virtual connection, and the target virtual connection is any one of the at least one virtual connection.

920. Determine, from total bandwidth resources of the multiple physical connections and according to timeslot configuration tables used by the multiple physical connections, a timeslot bandwidth resource that belongs to the target virtual connection. A timeslot configuration table used by each physical connection indicates a virtual connection to which each timeslot bandwidth resource obtained by dividing a bandwidth resource of each physical connection belongs.

930. Transmit the service stream to the receive end using the timeslot bandwidth resource that belongs to the target virtual connection. A field that identifies content of a timeslot resource configuration timeslot configuration table in an overhead code block transmitted over each physical connection is used to transmit only a timeslot resource configuration timeslot configuration table currently used by each physical connection.

In a current system, the transmit end transmits content of each timeslot resource configuration timeslot configuration table to the receive end, and indicates a currently used table in an overhead area. Therefore, a large amount of redundant information (for example, content of a timeslot configuration table that is not used by a current physical connection does not need to be transmitted) is transmitted. However, in this embodiment of the present invention, only content of a timeslot configuration table used by the current physical connection is transmitted in the overhead area, so that transmission efficiency is improved, and a waste of overhead resources is avoided.

Figure 10:
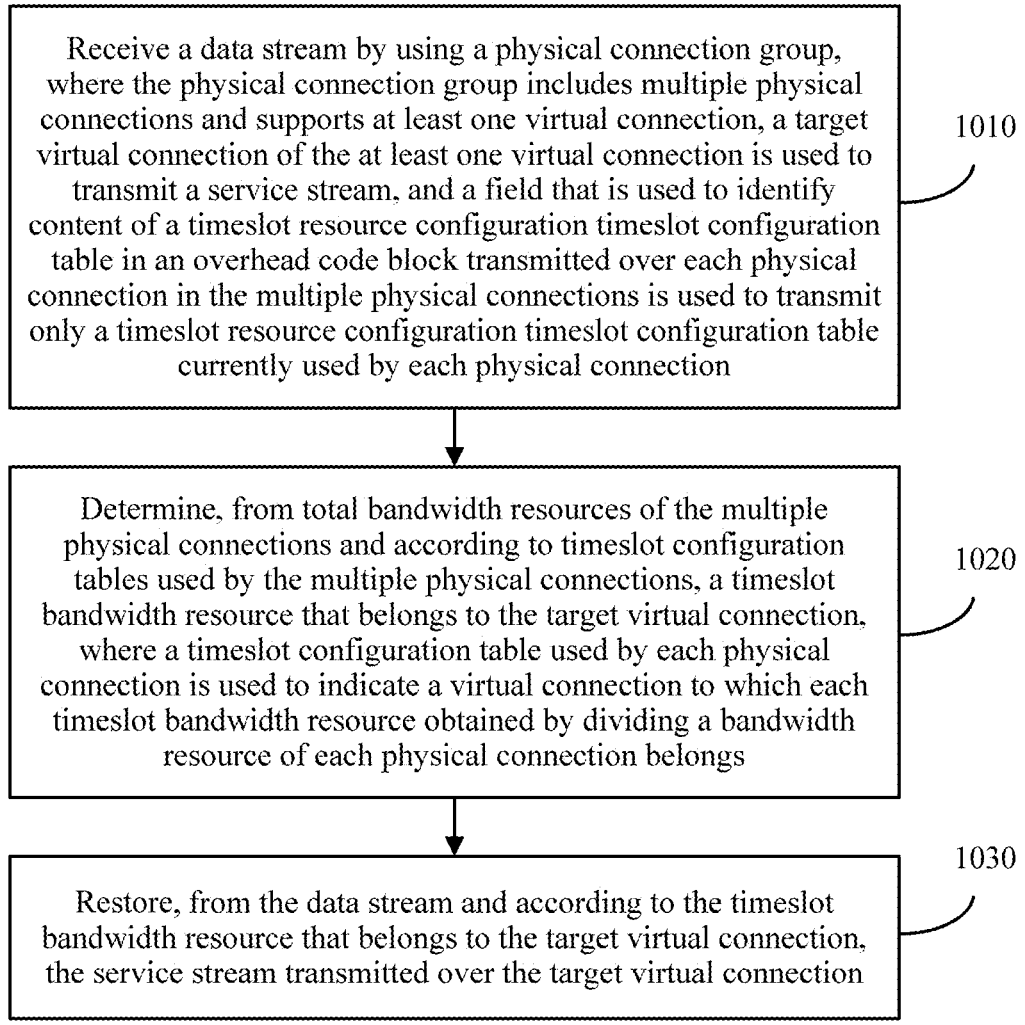
FIG. 10 is a schematic flowchart of a method for transmitting a service stream in a flexible Ethernet according to an embodiment of the present invention.

FIG. 10 is a schematic flowchart of a method for transmitting a service stream in a flexible Ethernet according to an embodiment of the present invention. The method in FIG. 10 may be executed by a receive end. The method includes the following steps.

1010. Receive a data stream using a physical connection group. The physical connection group includes multiple physical connections and supports at least one virtual connection. A target virtual connection of the at least one virtual connection is used to transmit a service stream, and a field that is used to identify content of a timeslot resource configuration timeslot configuration table in an overhead code block transmitted over each physical connection in the multiple physical connections is used to transmit only a timeslot resource configuration timeslot configuration table currently used by each physical connection.

1020. Determine, from total bandwidth resources of the multiple physical connections and according to timeslot configuration tables used by the multiple physical connections, a timeslot bandwidth resource that belongs to the target virtual connection, where a timeslot configuration table used by each physical connection is used to indicate a virtual connection to which each timeslot bandwidth resource obtained by dividing a bandwidth resource of each physical connection belongs.

1030. Restore, from the data stream and according to the timeslot bandwidth resource that belongs to the target virtual connection, the service stream transmitted over the target virtual connection.

In a current system, a transmit end transmits content of each timeslot configuration table to the receive end, and indicates a currently used table in an overhead area. Therefore, a large amount of redundant information (for example, content of a timeslot configuration table that is not used by a current physical connection does not need to be transmitted) is transmitted. However, in this embodiment of the present invention, only content of a timeslot configuration table used by the current physical connection is transmitted in the overhead area, so that transmission efficiency is improved, and a waste of overhead resources is avoided.

Figure 11:
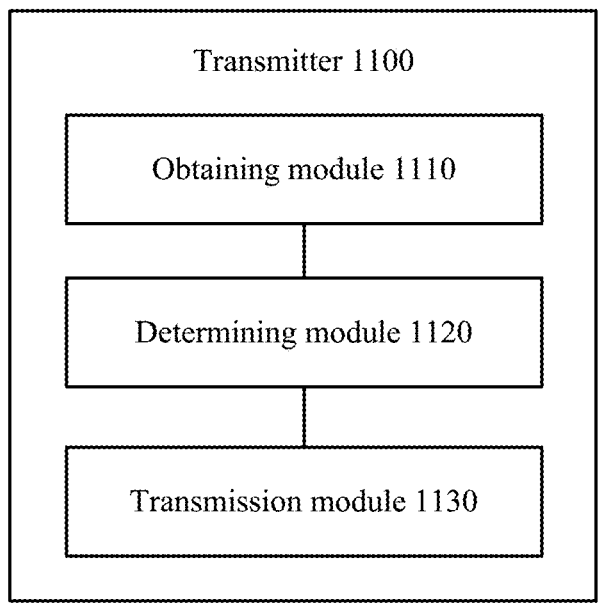
FIG. 11 is a schematic structural diagram of a transmitter according to an embodiment of the present invention.

FIG. 11 is a schematic structural diagram of a transmitter according to an embodiment of the present invention. It should be understood that, the transmitter 1100 in FIG. 11 can implement steps executed by the transmit end in FIG. 9. To avoid repetition, details are not described herein again. The transmitter 1100 in FIG. 11 includes an obtaining module 1110, configured to obtain a to-be-transmitted service stream, where the service stream is to be transmitted by using a target virtual connection supported by a physical connection group between a transmit end and a receive end, the physical connection group includes multiple physical connections and supports at least one virtual connection, and the target virtual connection is any one of the at least one virtual connection. The transmitter 1100 also includes a determining module 1120, configured to determine, from total bandwidth resources of the multiple physical connections and according to timeslot configuration tables used by the multiple physical connections, a timeslot bandwidth resource that belongs to the target virtual connection, where a timeslot configuration table used by each physical connection is used to indicate a virtual connection to which each timeslot bandwidth resource obtained by dividing a bandwidth resource of each physical connection belongs. The transmitter 1100 also includes a transmission module 1130, configured to transmit the service stream to the receive end by using the timeslot bandwidth resource that belongs to the target virtual connection, where a field that is used to identify content of a timeslot resource configuration timeslot configuration table in an overhead code block transmitted over each physical connection is used to transmit only a timeslot resource configuration timeslot configuration table currently used by each physical connection.

In a current system, the transmit end transmits content of each timeslot resource configuration timeslot configuration table to the receive end, and indicates a currently used table in an overhead area. Therefore, a large amount of redundant information (for example, content of a timeslot configuration table that is not used by a current physical connection does not need to be transmitted) is transmitted. However, in this embodiment of the present invention, only content of a timeslot configuration table used by the current physical connection is transmitted in the overhead area, so that transmission efficiency is improved, and a waste of overhead resources is avoided.

Figure 12:
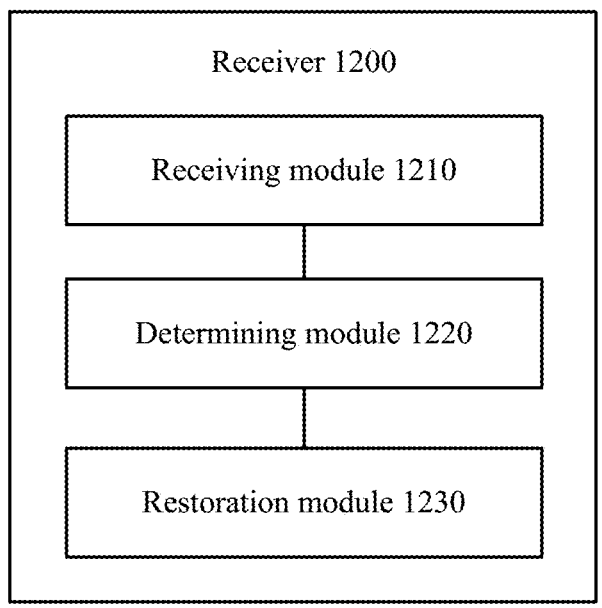
FIG. 12 is a schematic structural diagram of a receiver according to an embodiment of the present invention.

FIG. 12 is a schematic structural diagram of a receiver according to an embodiment of the present invention. It should be understood that, the receiver 1200 in FIG. 12 can implement steps executed by the receive end in FIG. 10. To avoid repetition, details are not described herein again. The receiver 1200 in FIG. 12 includes a receiving module 1210, configured to receive a data stream by using a physical connection group. The physical connection group includes multiple physical connections and supports at least one virtual connection. A target virtual connection of the at least one virtual connection is used to transmit a service stream, and a field that is used to identify content of a timeslot resource configuration timeslot configuration table in an overhead code block transmitted over each physical connection in the multiple physical connections is used to transmit only a timeslot resource configuration timeslot configuration table currently used by each physical connection. The receiver 1200 also includes a determining module 1220, configured to determine, from total bandwidth resources of the multiple physical connections and according to timeslot configuration tables used by the multiple physical connections, a timeslot bandwidth resource that belongs to the target virtual connection. A timeslot configuration table used by each physical connection is used to indicate a virtual connection to which each timeslot bandwidth resource obtained by dividing a bandwidth resource of each physical connection belongs. The receiver 1200 also includes a restoration module 1230, configured to restore, from the data stream and according to the timeslot bandwidth resource that belongs to the target virtual connection, the service stream transmitted over the target virtual connection.

In a current system, a transmit end transmits content of each timeslot configuration table to the receive end, and indicates a currently used table in an overhead area. Therefore, a large amount of redundant information (for example, content of a timeslot configuration table that is not used by a current physical connection does not need to be transmitted) is transmitted. However, in this embodiment of the present invention, only content of a timeslot configuration table used by the current physical connection is transmitted in the overhead area, so that transmission efficiency is improved, and a waste of overhead resources is avoided.

Figure 13:
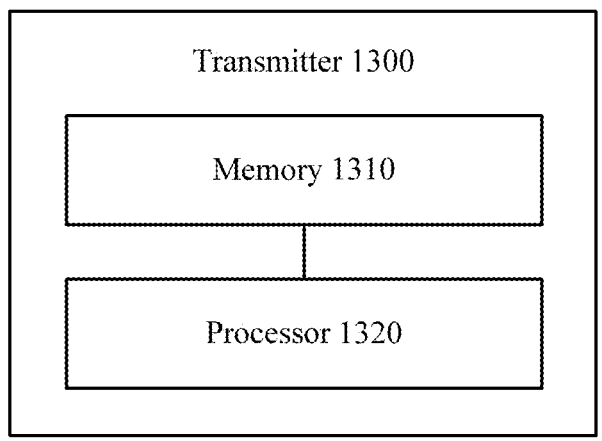
FIG. 13 is a schematic structural diagram of a transmitter according to an embodiment of the present invention.

FIG. 13 is a schematic structural diagram of a transmitter according to an embodiment of the present invention. It should be understood that, the transmitter 1300 in FIG. 13 can implement steps executed by the transmit end in FIG. 9. To avoid repetition, details are not described herein again. The transmitter 1300 in FIG. 13 a memory 1310, configured to store a program. The transmitter 1300 also includes a processor 1320, configured to execute the program. When the program is executed, the processor 1320 is configured to: obtain a to-be-transmitted service stream, where the service stream is to be transmitted using a target virtual connection supported by a physical connection group between a transmit end and a receive end, the physical connection group includes multiple physical connections and supports at least one virtual connection, and the target virtual connection is any one of the at least one virtual connection; determine, from total bandwidth resources of the multiple physical connections and according to timeslot configuration tables used by the multiple physical connections, a timeslot bandwidth resource that belongs to the target virtual connection, where a timeslot configuration table used by each physical connection is used to indicate a virtual connection to which each timeslot bandwidth resource obtained by dividing a bandwidth resource of each physical connection belongs; and transmit the service stream to the receive end by using the timeslot bandwidth resource that belongs to the target virtual connection, where a field that is used to identify content of a timeslot resource configuration timeslot configuration table in an overhead code block transmitted over each physical connection is used to transmit only a timeslot resource configuration timeslot configuration table currently used by each physical connection.

In a current system, the transmit end transmits content of each timeslot resource configuration timeslot configuration table to the receive end, and indicates a currently used table in an overhead area. Therefore, a large amount of redundant information (for example, content of a timeslot configuration table that is not used by a current physical connection does not need to be transmitted) is transmitted. However, in this embodiment of the present invention, only content of a timeslot configuration table used by the current physical connection is transmitted in the overhead area, so that transmission efficiency is improved, and a waste of overhead resources is avoided.

Figure 14:
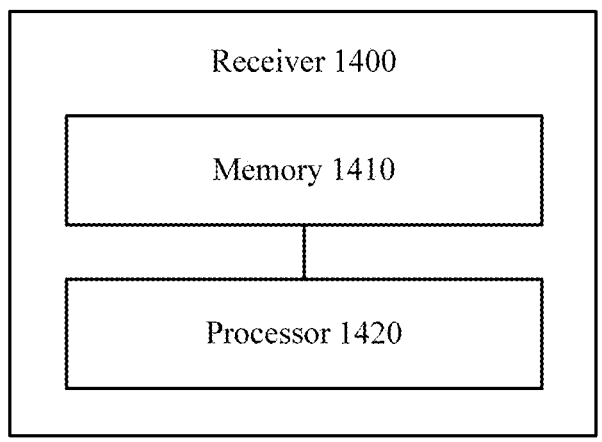
FIG. 14 is a schematic structural diagram of a receiver according to an embodiment of the present invention.

FIG. 14 is a schematic structural diagram of a receiver according to an embodiment of the present invention. It should be understood that, the receiver 1400 in FIG. 14 can implement steps executed by the receive end in FIG. 10. To avoid repetition, details are not described herein again. The receiver 1400 in FIG. 14 includes a memory 1410, configured to store a program. The receiver 1400 also includes a processor 1420, configured to execute the program. When the program is executed, the processor 1420 is configured to: receive a data stream using a physical connection group, where the physical connection group includes multiple physical connections and supports at least one virtual connection, a target virtual connection in the at least one virtual connection is used to transmit a service stream, and a field that is used to identify content of a timeslot resource configuration timeslot configuration table in an overhead code block transmitted over each physical connection in the multiple physical connections is used to transmit only a timeslot resource configuration timeslot configuration table currently used by each physical connection; determine, from total bandwidth resources of the multiple physical connections and according to timeslot configuration tables used by the multiple physical connections, a timeslot bandwidth resource that belongs to the target virtual connection, where a timeslot configuration table used by each physical connection is used to indicate a virtual connection to which each timeslot bandwidth resource obtained by dividing a bandwidth resource of each physical connection belongs; and restore, from the data stream and according to the timeslot bandwidth resource that belongs to the target virtual connection, the service stream transmitted over the target virtual connection.

In a current system, a transmit end transmits content of each timeslot configuration table to the receive end, and indicates a currently used table in an overhead area. Therefore, a large amount of redundant information (for example, content of a timeslot configuration table that is not used by a current physical connection does not need to be transmitted) is transmitted. However, in this embodiment of the present invention, only content of a timeslot configuration table used by the current physical connection is transmitted in the overhead area, so that transmission efficiency is improved, and a waste of overhead resources is avoided.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method, comprising:
    obtaining, by a transmit end, a service stream, wherein the service stream is to be transmitted by the transmit end to a receive end using a target virtual connection, the target virtual connection is supported by a physical connection group, the physical connection group comprises a plurality of physical connections, and the plurality of physical connections of the physical connection group is connected between the transmit end and the receive end; and
    transmitting, by the transmit end, the service stream to the receive end using a timeslot bandwidth resource that belongs to the target virtual connection, wherein, for each physical connection of the plurality of physical connections, a plurality of overhead code blocks transmitted over the respective physical connection comprises a first field and a management channel, wherein each first field indicates an identifier of a timeslot configuration table, each management channel transmits content of the timeslot configuration table, and the timeslot configuration table indicates the timeslot bandwidth resource that belongs to the target virtual connection.

2. The method according to claim 1, wherein:
    the timeslot bandwidth resource that belongs to the target virtual connection comprises one or more timeslots of one physical connection of the physical connection group; or
    the timeslot bandwidth resource that belongs to the target virtual connection comprises one or more timeslots of more than one physical connection of the physical connection group.

3. The method according to claim 1, wherein each management channel further transmits content of a physical connection configuration table of the physical connection group, wherein the physical connection configuration table of the physical connection group indicates an identifier of each physical connection of the plurality of physical connections in the physical connection group and a sequence between the plurality of physical connections.

4. The method according to claim 3, wherein each management channel transmits, based on a protocol packet, content of the timeslot configuration table or content of the physical connection configuration table of the physical connection group.

5. The method according to claim 4, wherein each management channel further requests, based on the protocol packet, a change of the timeslot configuration table or the physical connection configuration table of the physical connection group.

6. The method according to claim 1, wherein all fields of M overhead code blocks in each plurality of overhead code blocks transmit the management channels, M is a positive integer, wherein the management channels transmit content of the timeslot configuration table or content of a physical connection configuration table of the physical connection group using Ethernet packets, and synchronization headers of the M overhead code blocks are usable for synchronization of the Ethernet packets.

7. The method according to claim 1, wherein the management channels implement a management channel of the physical connection group, the plurality of physical connections in the physical connection group share the management channel of the physical connection group, and content of the one or more timeslot configuration tables used by the plurality of physical connections, or content of a physical connection configuration table of the physical connection group, is transmitted using the management channel of the physical connection group.

8. A method, comprising:
    receiving, by a receive end, a data stream sent by a transmit end using a physical connection group, wherein the physical connection group comprises a plurality of physical connections, the physical connection group supports a target virtual connection, the target virtual connection transmits a service stream, wherein, for each physical connection of the plurality of physical connections, a plurality of overhead code blocks transmitted over the respective physical connection comprises a first field and a management channel, wherein each first field indicates an identifier of a timeslot configuration table, each management channel transmits content of the timeslot configuration table, and wherein the timeslot configuration table indicates a timeslot bandwidth resource that belongs to the target virtual connection; and
    restoring, from the data stream and according to the timeslot bandwidth resource that belongs to the target virtual connection, the service stream transmitted over the target virtual connection.

9. The method according to claim 8, wherein the management channels further transmit:
    content of a physical connection configuration table of the physical connection group, wherein the physical connection configuration table of the physical connection group indicates an identifier of each physical connection of the plurality of physical connections in the physical connection group and a sequence between the plurality of physical connections.

10. The method according to claim 9, wherein the management channels transmit, based on a protocol packet, content of the timeslot configuration table or content of the physical connection configuration table of the physical connection group.

11. A transmitter, comprising:
    at least one processor configured to:
        obtain a service stream, wherein the service stream is to be transmitted by the transmit end to a receive end using a target virtual connection, the target virtual connection is supported by a physical connection group, the physical connection group comprises a plurality of physical connections, and the plurality of physical connections is connected between the transmit end and the receive end; and
        transmit the service stream to the receive end using a timeslot bandwidth resource that belongs to the target virtual connection, wherein, for each physical connection of the plurality of physical connections, a plurality of overhead code blocks transmitted over the respective physical connection comprises a first field and a management channel, wherein each first field indicates an identifier of a timeslot configuration table, each management channel transmits content of the timeslot configuration table, and wherein the timeslot configuration table indicates the timeslot bandwidth resource that belongs to the target virtual connection.

12. The transmitter according to claim 11, wherein:
the timeslot bandwidth resource that belongs to the target virtual connection comprises one or more timeslots of one physical connection of the physical connection group; or
the timeslot bandwidth resource that belongs to the target virtual connection comprises one or more timeslots of more than one physical connection of the physical connection group.

13. The transmitter according to claim 11, wherein each management channel further transmits content of a physical connection configuration table of the physical connection group, wherein the physical connection configuration table of the physical connection group indicates an identifier of each physical connection of the plurality of physical connections in the physical connection group and a sequence between the plurality of physical connections.

14. The transmitter according to claim 13, wherein each management channel transmits, based on a protocol packet, content of the timeslot configuration table or content of the physical connection configuration table of the physical connection group.

15. The transmitter according to claim 14, wherein each management channel further requests, based on the protocol packet, a change of the timeslot configuration table or the physical connection configuration table of the physical connection group.

16. The transmitter according to claim 11, wherein all fields of M overhead code blocks in each plurality of overhead code blocks transmit the management channels, M is a positive integer, wherein the management channels transmit the content of the timeslot configuration table or content of a physical connection configuration table of the physical connection group using Ethernet packets, and synchronization headers of the M overhead code blocks are usable for synchronization of the Ethernet packets.

17. The transmitter according to claim 11, wherein the management channels implement a management channel of the physical connection group, the plurality of physical connections in the physical connection group share the management channel of the physical connection group, and content of the one or more timeslot configuration tables used by the plurality of physical connections, or content of a physical connection configuration table of the physical connection group, is transmitted using the management channel of the physical connection group.

18. A receiver, comprising:
at least one processor configured to:
receive, by a receive end, a data stream sent by a transmit end using a physical connection group, wherein the physical connection group comprises a plurality of physical connections, the physical connection group supports a target virtual connection, the target virtual connection transmits a service stream, wherein, for each physical connection of the plurality of physical connections, a plurality of overhead code blocks transmitted over the respective physical connection comprises a first field and a management channel, wherein each first field indicates an identifier of a timeslot configuration table, each management channel transmits content of the timeslot configuration table, and wherein the timeslot configuration table indicates a timeslot bandwidth resource that belongs to the target virtual connection; and
restore, from the data stream and according to the timeslot bandwidth resource that belongs to the target virtual connection, the service stream transmitted over the target virtual connection.

19. The receiver according to claim 18, wherein the management channels further transmit:
content of a physical connection configuration table of the physical connection group, wherein the physical connection configuration table of the physical connection group indicates an identifier of each physical connection of the plurality of physical connections in the physical connection group and a sequence between the plurality of physical connections.

20. The receiver according to claim 18, wherein the management channels transmit, based on a protocol packet, content of the timeslot configuration table or content of a physical connection configuration table of the physical connection group.

* * * * *